United States Patent
Tamura et al.

(10) Patent No.: US 7,968,432 B2
(45) Date of Patent: Jun. 28, 2011

(54) LASER PROCESSING APPARATUS AND LASER PROCESSING METHOD

(75) Inventors: Muneo Tamura, Nagoya (JP); Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 1020 days.

(21) Appl. No.: 11/598,653

(22) Filed: Nov. 14, 2006

(65) Prior Publication Data

US 2007/0202619 A1    Aug. 30, 2007

(30) Foreign Application Priority Data

Nov. 16, 2005 (JP) .................................. 2005-331220
Nov. 16, 2005 (JP) .................................. 2005-331222

(51) Int. Cl.
    *H01L 21/76* (2006.01)
(52) U.S. Cl. ............ 438/463; 438/33; 438/68; 438/110; 257/527; 257/E21.218; 257/E21.508; 257/E23.067
(58) Field of Classification Search .................... 438/33, 438/68, 106, 108, 110, 113, 458, 460, 462, 438/463, FOR. 386; 257/527, E21.218, E21.508, 257/E21.599, E23.004, E23.067
    See application file for complete search history.

(56) References Cited

U.S. PATENT DOCUMENTS

| | | | |
|---|---|---|---|
| 6,787,732 B1* | 9/2004 | Xuan et al. ................ | 219/121.67 |
| 6,992,026 B2 | 1/2006 | Fukuyo et al. | |
| 2002/0018431 A1* | 2/2002 | Stallinga ................. | 369/112.02 |
| 2004/0002199 A1* | 1/2004 | Fukuyo et al. ................ | 438/460 |
| 2004/0061851 A1* | 4/2004 | Isozaki et al. ............. | 356/237.3 |
| 2005/0006361 A1 | 1/2005 | Kobayashi et al. | |
| 2005/0063280 A1* | 3/2005 | Kim et al. ................. | 369/112.01 |
| 2005/0098548 A1 | 5/2005 | Kobayashi et al. | |
| 2005/0173387 A1* | 8/2005 | Fukuyo et al. ........... | 219/121.67 |
| 2005/0181581 A1 | 8/2005 | Fukuyo et al. | |
| 2005/0184037 A1 | 8/2005 | Fukuyo et al. | |
| 2005/0189330 A1 | 9/2005 | Fukuyo et al. | |
| 2005/0194364 A1 | 9/2005 | Fukuyo et al. | |
| 2005/0202596 A1 | 9/2005 | Fukuyo et al. | |
| 2005/0205536 A1 | 9/2005 | Norikane et al. | |
| 2006/0011593 A1 | 1/2006 | Fukuyo et al. | |
| 2006/0040473 A1 | 2/2006 | Fukuyo et al. | |
| 2006/0076326 A1 | 4/2006 | Kobayashi et al. | |

(Continued)

FOREIGN PATENT DOCUMENTS

JP    A-S51-027195    3/1976

(Continued)

OTHER PUBLICATIONS

Office Action dated Nov. 15, 2007 in corresponding Korean Patent Application No. 10-2006-0113419 (and English translation).

(Continued)

*Primary Examiner* — Matthew Smith
*Assistant Examiner* — Su C Kim
(74) *Attorney, Agent, or Firm* — Posz Law Group, PLC

(57) ABSTRACT

A laser processing apparatus has one laser light source that simultaneously radiates laser beams with two wavelengths. Depth positions of focusing points for laser beams are gradually changed in a wafer. Three sets of modifying region groups, i.e., six layers of modifying region groups, are successively formed. One set of modifying region groups constitutes two layers and is formed at a time. The modifying region groups are separated, adjoined, or overlapped with each other along an estimated cut line of the wafer in a depth direction from a surface thereof.

10 Claims, 21 Drawing Sheets

U.S. PATENT DOCUMENTS

| | | | |
|---|---|---|---|
| 2006/0108338 A1* | 5/2006 | Nishiwaki et al. | 219/121.72 |
| 2006/0160331 A1 | 7/2006 | Fukuyo et al. | |
| 2006/0285112 A1* | 12/2006 | Reich et al. | 356/400 |
| 2007/0235418 A1* | 10/2007 | Park et al. | 219/121.6 |

FOREIGN PATENT DOCUMENTS

| | | | |
|---|---|---|---|
| JP | A-H06-106378 | | 4/1994 |
| JP | A-H06-114577 | | 4/1994 |
| JP | A-08-010970 | | 1/1996 |
| JP | A-2003-266185 | | 9/2003 |
| JP | A-2004-111946 | | 4/2004 |
| JP | A-2004-337903 | | 12/2004 |
| JP | 2005-109322 | * | 4/2005 |
| JP | A-2005-243977 | | 9/2005 |
| JP | A-2006-007619 | | 1/2006 |
| WO | WO 00/13838 | | 3/2000 |

OTHER PUBLICATIONS

Office Action dated Feb. 20, 2008 in corresponding German Patent Application No. 10 2006 053898.6-43 (and English translation).

Office Action dated Jul. 4, 2008 in corresponding Chinese patent application No. 200610148535.9 (and English Translation).

Notice of Reason for Refusal mailed Jan. 19, 2010 from the Japan Patent Office Action for corresponding patent application No. 2005-331220 (and English Translation).

Notice of Reason for Refusal mailed Jan. 19, 2010 from the Japan Patent Office Action for corresponding patent application No. 2005-331222 (and English Translation).

Office Action dated Apr. 7, 2010 from the German Patent Office Action for corresponding patent application No. 10 2006 053 898.6 (and English Translation).

* cited by examiner

LASER PROCESSING APPARATUS AND LASER PROCESSING METHOD

CROSS REFERENCE TO RELATED APPLICATION

This application is based on and incorporates herein by reference Japanese Patent Applications No. 2005-331220 filed on Nov. 16, 2005 and 2005-331222 filed on Nov. 16, 2005.

FIELD OF THE INVENTION

The present invention relates to a laser processing apparatus and a laser processing method. More specifically, the invention relates to a laser processing apparatus and a processing method thereof for radiating a laser beam to a wafer and forming a modifying region therein according to multiphoton absorption.

BACKGROUND OF THE INVENTION

According to a recent attempt, the laser dicing technology as disclosed in patent documents 1 through 4 is used to form a modifying region (modifying layer) in a wafer (semiconductor wafer) for fabricating a semiconductor substrate. The modifying region is used as a cutting origin for tearing to cut and separate a wafer into chips (semiconductor chips).

For example, patent document 1 proposes the following technology. A laser beam is radiated to a focusing point in a wafer-shaped process object. In the process object, the multiphoton absorption forms a modifying region (i.e., a modifying region containing a crack region, a modifying region containing a melt treatment region, and a modifying region containing a region with a modified refractive index). The modifying region is used to form a region as a cutting origin along an estimated cut line of the process object for a specified distance inside from a laser beam incident surface of the process object. The process object is cut by tearing based on the region as an origin.

Patent document 1 discloses radiation of laser beams from multiple laser light sources in different directions to a focusing point in a process object (see claim 7 and FIG. 17 in patent document 1). The use of multiple laser light sources can provide a laser beam's focusing point with an electric field strength large enough to generate multiphoton absorption. A continuous wave laser beam provides a smaller instantaneous power than a pulse laser beam, but nevertheless can form a modifying region.

Patent document 1 further discloses provision of a light source unit in which multiple laser light sources are arranged in an array along an estimated cut line (see claim 10 and FIG. 18 in patent document 1). This technology claims to simultaneously form multiple focusing points along the estimated cut line and improve a processing speed.

However, the technology according to patent document 1 forms only one layer of modifying region along a depth direction from the wafer surface. When a wafer is thick, it is technologically difficult to accurately cut and separate the wafer along an estimated cut line. When the technology of patent document 1 radiates laser beams from multiple laser light sources in different directions to the focusing point in a process object, only one layer of modifying region is formed along the depth direction from the wafer surface. The technology shows decreased processing efficiency and low throughput (productivity per unit time) and is unsuited for mass production.

As mentioned above, the technology of patent document 1 radiates laser beams from multiple laser light sources in different directions to the focusing point in a process object. When a laser beam is radiated from a wafer surface, the laser beam is slantwise incident on the wafer surface. A semiconductor device may be damaged due to radiation of a laser beam to a region for forming the semiconductor device on the wafer surface. In consideration for this, an estimated cut line needs to be wide enough to radiate the laser beam. Widening the estimated cut line decreases the number of chips that can be cut from one wafer. The chip yield is limited to increase manufacturing costs for chips.

Patent document 2 proposes the technology to radiate a laser beam to a process object at the laser beam's focusing point in the process object. A modifying region is formed in the process object along an estimated cut line of the process object. Further, the laser beam is radiated to the process object by changing the position of the laser beam's focusing point along the incident direction toward the process object to form multiple modifying regions along the incident direction.

The technology of patent document 2 forms multiple modifying regions along the incident direction to increase origins to cut the process object. Even a thick process object can be cut.

The technology according to patent document 3 proposes a laser processing apparatus to form a modifying region using multiphoton absorption in a wafer-shaped process object. The laser processing apparatus is provided with a condenser lens and moving means. The condenser lens condenses first and second laser beams with different wavelengths into the inside of the process object. The condenser lens generates multiphoton absorption based on the first laser beam's focusing point position and the second laser beam's focusing point position. The moving means relatively moves the focusing points of the first and second laser beams along an estimated cut line of the process object.

Since the technology of patent document 3 uses the first and second laser beams with different wavelengths, a chromatic aberration or the like causes the laser beams to condense into positions with different depths from a process object surface toward the condenser lens. The focusing point of each laser beam is relatively moved along the estimated cut line. A single scan along the estimated cut line can form two modifying regions corresponding to the first and second laser beams. According to the disclosure of patent document 3, one condenser lens condenses three or more laser beams with different wavelengths and radiates the laser beams to a process object. A single scan along the estimated cut line can form three or more modifying regions.

The technology of patent document 2 or 3 forms multiple modifying regions in the depth direction from the wafer surface. Even a thick wafer increases locations as origins to cut the wafer. It is possible to accurately cut to separate a wafer along the estimated cut line.

However, the technology of patent document 2 stepwise changes a position of the laser beam's focusing point in the laser beam's incident direction to the wafer. The processing efficiency is degraded because one modifying region is formed at a time with an interval in the depth direction from the wafer surface. Forming multiple modifying regions is time-consuming. The technology shows low throughput (productivity per unit time) and is unsuited for mass production.

By contrast, the technology of patent document 3 radiates multiple laser beams with different wavelengths to a wafer to simultaneously form multiple modifying regions with different depths corresponding to the laser beams. Compared to the technology of patent document 2, the technology of patent document 3 increases the processing efficiency and can form multiple modifying regions in a short period of time. However, the technology of patent document 3 uses a single laser light source to radiate a laser beam with one type of wavelength. An individual laser light source needs to be provided for each laser beam with a different wavelength, increasing the number of laser light sources. Accordingly, the laser processing apparatus becomes large and increases an installation space. In addition, the laser processing apparatus becomes complicated to increase the number of parts and therefore manufacturing costs.

The technology of patent document 2 uses the laser beam with one type of wavelength to form a modifying region. When a wafer is very thick, it is difficult to reliably form normal modifying regions at a shallow portion and a deep portion from the wafer surface, i.e., the incidence plane for the laser beam.

For example, let us suppose that the laser beam wavelength is set so as to reliably form a normal modifying region at a shallow portion from the wafer surface. In this case, it is difficult to reliably form a normal modifying region at a deep portion from the wafer surface. Reversely, let us suppose that the laser beam wavelength is set so as to reliably form a normal modifying region at a deep portion from the wafer surface. In this case, it is difficult to reliably form a normal modifying region at a shallow portion from the wafer surface.

Recently, the semiconductor substrate multi-layering technology has advanced. An attempt is made to use the laser dicing technologies disclosed in patent documents 1 through 3 for a multi-layer wafer and cut to separate it. The semiconductor substrate multi-layering technology covers, for example, the SOI (Silicon On Insulator) technology including the bonding technology and the SIMOX (Separation by IMplanted OXygen) technology, the crystal growth technology for a III-V compound semiconductor layer on a substrate such as sapphire, and the technology of using anodic bonding to bond a silicon substrate and a glass substrate.

Since the technology according to patent document 1 or 2 uses the laser beam with one type of wavelength to form the modifying region, it is difficult to reliably form a normal modifying region in a multi-layer wafer. The reason may be as follows. Layers of a multi-layer have different optical characteristics. Each layer indicates a specific refractive index for laser beams. A laser beam partly reflects on a boundary surface between the layers. The reflected light interferes with the incident light to be canceled. The laser beam energy greatly attenuates at a deep portion from the incidence plane for the laser beam. The deep portion is short of the energy for laser beam L needed to generate multiphoton absorption. The modifying region cannot be formed.

When a wafer is not reliably provided with a normal modifying regions, the wafer unnecessarily cracks during separation by cutting. Accurate separation by cutting is difficult along an estimated cut line, decreasing the yield and the quality of chips that are cut and separated from the wafer.

The technology proposed in patent document 4 provides a laser dicing apparatus that applies a laser beam from a wafer surface and forms a modifying region in the wafer. The apparatus is provided with multiple laser heads and a chuck table. The laser heads radiate the laser beams to the wafer. The chuck table mounts the wafer and moves to the X direction, i.e., a process direction, relatively to the laser heads. The laser heads are configured to be independently movable in Y directions orthogonal to the X direction.

According to the technology of patent document 4, the multiple laser heads can independently move in the Y direction. Multiple lines can be simultaneously processed on a wafer with various process pitches. This may result in an improved processing efficiency.

Patent document 4 discloses that the multiple laser heads are provided so as to be independently movable in a Z direction orthogonal to the X and Y directions. It is possible to specify different focusing points along the Z direction for laser beams radiated from the multiple laser heads. One process stroke can form multiple layers of modifying regions in the wafer, making it possible to easily tear even a thick wafer.

According to the technology of patent document 4, modifying regions may be formed at a shallow portion first and then at a deep portion from the wafer surface as an incidence plane. In this case, the modifying region formed at the shallow portion hinders incidence of a laser beam for forming the modifying region at the deep portion. It is difficult to reliably form a normal modifying region at a deep portion.

Patent document 1: JP-3408805 B
Patent document 2: JP-2002-205180 A
Patent document 3: JP-2004-337903 A
Patent document 4: JP-2004-111946 A

SUMMARY OF THE INVENTION

The present invention has been made in consideration of the foregoing. Objects of the invention are as follows. (1) One object is to provide a small and low-cost laser processing apparatus capable of reliably forming a normal modifying region in a short period of time in order to form multiple modifying regions in a depth direction from a wafer surface. (2) Another object is to provide a low-cost laser processing method capable of reliably forming a normal modifying region in a short period of time in order to form multiple modifying regions in a depth direction from a wafer surface.

According to an aspect of the present invention, a laser processing apparatus, which radiates a laser beam to a focusing point in a wafer to form a modifying region due to multiphoton absorption in the wafer, is provided as follows. One laser light source is included for simultaneously generating and radiating a laser beam having a plurality of wavelengths. One condenser lens is included for converging a laser beam radiated from the laser light source on the focusing point. A laser beam having a plurality of wavelengths is simultaneously radiated to a plurality of focusing points inside from a surface of the wafer to simultaneously form a plurality of modifying regions, which are disposed with an interval in a depth direction from the surface of the wafer, along an estimated cut line of the wafer.

According to another aspect of the present invention, a laser processing apparatus, which radiates a laser beam to a focusing point in a wafer to form a modifying region due to multiphoton absorption in the wafer, is provided as follows. One laser light source is included for generating and radiating a laser beam having one wavelength selected from a plurality of wavelengths. One condenser lens is included for converging a laser beam radiated from the laser light source on the focusing point. A focusing point is settled inside each portion of a plurality of portions obtained by dividing a depth from a surface of the wafer, for radiating a laser beam having a wavelength appropriate to the each portion to form at least one modifying region at the each portion, along an estimated cut line of the wafer.

According to another aspect of the present invention, a laser processing apparatus, which radiates a laser beam to a focusing point in a multi-layer wafer with a plurality of wafer layers to form a modifying region due to multiphoton absorption in the wafer, is provided as follows. One laser light source is included for generating and radiating a laser beam having one wavelength selected from a plurality of wavelengths. One condenser lens is included for converging a laser beam radiated from the laser light source on the focusing point. A focusing point is settled inside each wafer layer in the multi-layer wafer, for radiating a laser beam having a wavelength appropriate to the each wafer layer from a surface of a top wafer layer in the multi-layer wafer to form at least one modifying region in the each wafer layer along an estimated cut line of the multi-layer wafer.

According to another aspect of the present invention, a laser processing apparatus is provided as follows. A laser beam is radiated to a focusing point in a two-layer wafer to form a modifying region due to multiphoton absorption in the wafer. The two-layer wafer is formed by layering a second layer having a first side and a second side over a first layer having a first side and a second side with the second side of the second layer facing the first side of the first layer. One laser light source is included for generating and radiating a laser beam having one wavelength selected from a plurality of wavelengths. One condenser lens is included for converging a laser beam radiated from the laser light source on the focusing point. A focusing point is settled inside the second layer for radiating from the first side of the second layer a laser beam having a wavelength appropriate to the second layer to form at least one modifying region inside the second layer along an estimated cut line of the two-layer wafer. A focusing point is settled inside the first layer for radiating from the second side of the first layer a laser beam having a wavelength appropriate to the first layer to form at least one modifying region inside the first layer along the estimated cut line of the two-layer wafer.

According to another aspect of the present invention, a laser processing method for radiating a laser beam to a focusing point in a wafer to form a modifying region due to multiphoton absorption in the wafer is provided with the following: using (i) one laser light source for simultaneously generating and radiating a laser beam having a plurality of wavelengths and (ii) one condenser lens for converging a laser beam radiated from the laser light source on the focusing point; selecting a plurality of wavelengths of a laser beam appropriate to a plurality of focusing points inside the wafer; and radiating, from a surface of the wafer, the laser beam having the plurality of wavelengths to the plurality of focusing points simultaneously to form a plurality of modifying regions simultaneously along an estimated cut line of the wafer, the modifying regions disposed with an interval in a depth direction from the surface of the wafer.

According to another aspect of the present invention, a laser processing method for radiating a laser beam to a focusing point in a wafer to form a modifying region due to multiphoton absorption in the wafer is provided with the following: using (i) one laser light source for generating and radiating a laser beam having one wavelength selected from a plurality of wavelengths and (ii) one condenser lens for converging a laser beam radiated from the laser light source on the focusing point; settling a focusing point inside each portion of a plurality of portions obtained by dividing a depth from a surface of the wafer; and radiating a laser beam having a wavelength appropriate to the each portion to form at least one modifying region at the each portion along an estimated cut line of the wafer.

According to another aspect of the present invention, a laser processing method for radiating a laser beam to a focusing point in a multi-layer wafer with a plurality of wafer layers to form a modifying region due to multiphoton absorption in the wafer is provided with the following: using (i) one laser light source for generating and radiating a laser beam having one wavelength selected from a plurality of wavelengths and (ii) one condenser lens for converging a laser beam radiated from the laser light source on the focusing point; settling a focusing point inside each wafer layer in the multi-layer wafer; and radiating from a surface of a top wafer layer in the multi-layer wafer a laser beam having a wavelength appropriate to the each wafer layer to form at least one modifying region in the each wafer layer along an estimated cut line of the multi-layer wafer.

According to another aspect of the present invention, a laser processing method for radiating a laser beam to a focusing point in a two-layer wafer formed by layering a second layer having a first side and a second side over a first layer having a first side and a second side with the second side of the second layer facing the first side of the first layer to form a modifying region due to multiphoton absorption in the wafer is provided with the following: using (i) one laser light source for generating and radiating a laser beam having one wavelength selected from a plurality of wavelengths and (ii) one condenser lens for converging a laser beam radiated from the laser light source on the focusing point; setting a focusing point inside the second layer; radiating from the first side of the second layer a laser beam having a wavelength appropriate to the second layer to form at least one modifying region inside the second layer along an estimated cut line of the two-layer wafer; setting a focusing point inside the first layer; and radiating from the second side of the first layer a laser beam having a wavelength appropriate to the first layer to form at least one layer of a modifying region inside the first layer along the estimated cut line of the two-layer wafer.

According to another aspect of the present invention, a laser processing apparatus, which radiates a laser beam to a focusing point in a wafer to form a modifying region due to multiphoton absorption in the wafer, is provided as follows. A plurality of laser heads are included. Each laser head includes a laser light source for generating and radiating a laser beam and a condenser lens for converging a laser beam radiated from the laser light source on a focusing point. A plurality of laser beams simultaneously generated from the plurality of laser heads are focused on a plurality of focusing points, which are different from each other, to simultaneously form a plurality of modifying regions at an interval in a depth direction from a surface of the wafer. A plurality of modifying region groups, which are multi-layered, are simultaneously formed by moving the plurality of focusing points relatively to the wafer while radiating the plurality of laser beams in a pulsed manner along an estimated cut line for the wafer. Each modifying region group includes a plurality of modifying regions formed at an interval horizontally with reference to a surface and a reverse side of the wafer. The plurality of laser beams are allowed to be perpendicularly incident on the surface of the wafer. A movement direction of the plurality of focusing points is set with reference to the wafer so as to always first form, of the plurality of modifying regions, a modifying region deepest from the surface of the wafer. Depth positions of the plurality of focusing points are set in the wafer.

According to another aspect of the present invention, a laser processing apparatus, which radiates a laser beam to a focusing point in a wafer to form a modifying region due to multiphoton absorption in the wafer, is provided as follows. A plurality of laser heads are included. Each head includes a laser light source for generating and radiating a laser beam, and a condenser lens for converging a laser beam radiated from the laser light source on a focusing point. A horizontal moving member is included for moving the plurality of laser heads in a horizontal direction orthogonal to a plurality of parallel estimated cut lines provided for the wafer so as to align an interval between optical axes for a plurality of laser beams simultaneously generated from the plurality of laser heads to an interval between the estimated cut lines. A plurality of modifying region groups, which are multi-layered, are simultaneously formed, each modifying region group including a plurality of modifying regions formed at an interval horizontally with reference to a surface and a reverse side of the wafer, by moving a plurality of focusing points for the plurality of laser beams relatively to the wafer while radiating the plurality of laser beams in a pulsed manner along the plurality of estimated cut lines. The plurality of laser beams are allowed to be perpendicularly incident on the surface of the wafer. A movement direction of the plurality of focusing points is set with reference to the wafer so as to always first form, of the plurality of modifying regions, a modifying region deepest from the surface of the wafer. Depth positions of the plurality of focusing points are set in the wafer.

According to another aspect of the present invention, a laser processing method for radiating a laser beam to a focusing point in a wafer to form a modifying region due to multiphoton absorption in the wafer is provided with the following: using a plurality of laser heads, each laser head including (i) a laser light source for generating and radiating a laser beam and (ii) a condenser lens for converging a laser beam radiated from the laser light source on a focusing point; focusing a plurality of laser beams simultaneously generated from the plurality of laser heads on a plurality of focusing points, which are different from each other, to simultaneously form a plurality of modifying regions, which are disposed at an interval in a depth direction from a surface of the wafer; forming simultaneously a plurality of modifying region groups, each modifying region group including a plurality of modifying regions, which are formed at an interval horizontally with reference to a surface and a reverse side of the wafer, by moving the plurality of focusing points relatively to the wafer while radiating the plurality of laser beams in a pulsed manner along an estimated cut line for the wafer; allowing the plurality of laser beams to be perpendicularly incident on the wafer surface; setting a movement direction of the plurality of focusing points with reference to the wafer so as to always first form, of the plurality of modifying regions, a modifying region deepest from the surface of the wafer; and setting depth positions of the plurality of focusing points in the wafer.

According to another aspect of the present invention, a laser processing method for radiating a laser beam to a focusing point in a wafer to form a modifying region due to multiphoton absorption in the wafer is provided with the following: using a plurality of laser heads, each laser head including (i) a laser light source for generating and radiating a laser beam and (ii) a condenser lens for converging a laser beam radiated from the laser light source on a focusing point; moving the plurality of laser heads in a horizontal direction orthogonal to a plurality of parallel estimated cut lines provided for the wafer so as to align an interval between optical axes for a plurality of laser beams simultaneously generated from the plurality of laser heads to an interval between the estimated cut lines; forming simultaneously a plurality of modifying region groups, each modifying region group including a plurality of modifying regions formed at an interval horizontally with reference to a surface and a reverse side of the wafer, by moving a plurality of focusing points for the plurality of laser beams relatively to the wafer while radiating the plurality of laser beams in a pulsed manner along the plurality of estimated cut lines; allowing the plurality of laser beams to be perpendicularly incident on the wafer surface; setting a movement direction of the plurality of focusing points with reference to the wafer so as to always first form, of the plurality of modifying regions, a modifying region deepest from the surface of the wafer; and setting depth positions of the plurality of focusing points in the wafer.

According to another aspect of the present invention, a laser processing apparatus, which forms a modifying region due to multiphoton absorption in a wafer, is provided as follows. A plurality of laser heads are included which are arranged in a line parallel with a surface of the wafer. The laser heads individually include (i) laser light sources for radiating laser beams and (ii) condenser lenses for converging the laser beams on focusing points. The focusing points are disposed inside the wafer on a virtual plane, which is perpendicular to the surface of the wafer and includes the line, to be stepwise deepened from the surface of the wafer. A moving unit is included for moving the laser heads relative to the wafer parallel with the line to cause a focusing point deepest among the focusing points to precede while the laser beams are radiated to form a plurality of modifying region groups, which are multi-layered on the plane and each of which includes modifying regions corresponding to each of the focusing points.

According to another aspect of the present invention, a laser processing apparatus, which forms a modifying region due to multiphoton absorption in a wafer, is provided as follows. A plurality of laser heads are included which are arranged in a line parallel with a surface of the wafer. The laser heads individually include (i) laser light sources for radiating laser beams and (ii) condenser lenses for converging the laser beams on focusing points. The focusing points are disposed inside the wafer on a virtual plane, which is perpendicular to the surface of the wafer and includes the line, to be stepwise deepened from the surface of the wafer. A first moving unit is included for moving the laser heads relative to the wafer parallel with the line to cause a focusing point deepest among the focusing points to precede without the laser beams radiated. A second moving unit is included for moving the laser heads relative to the wafer orthogonally to the plane while the laser beams are radiated to form a plurality of modifying region groups, each of which includes modifying regions and is included in each of estimated cut lines for the wafer.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

1. First Embodiment

Figure 1A:
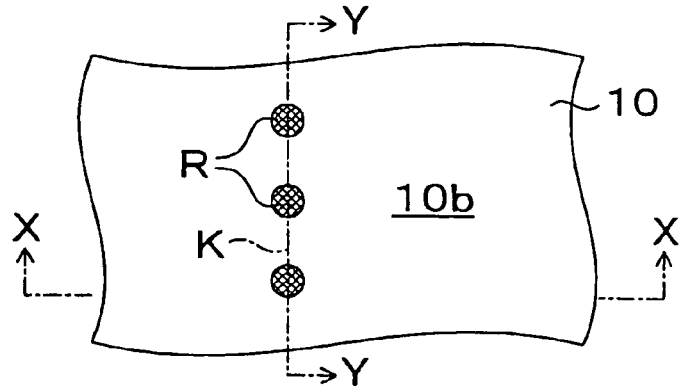
FIG. 1A is a plan view of a wafer and FIG. 1B is a sectional view taken in the line X-X of FIG. 1A for explaining processes to form a modifying region by radiating a laser beam on a wafer according to a first embodiment.
Figure 1B:
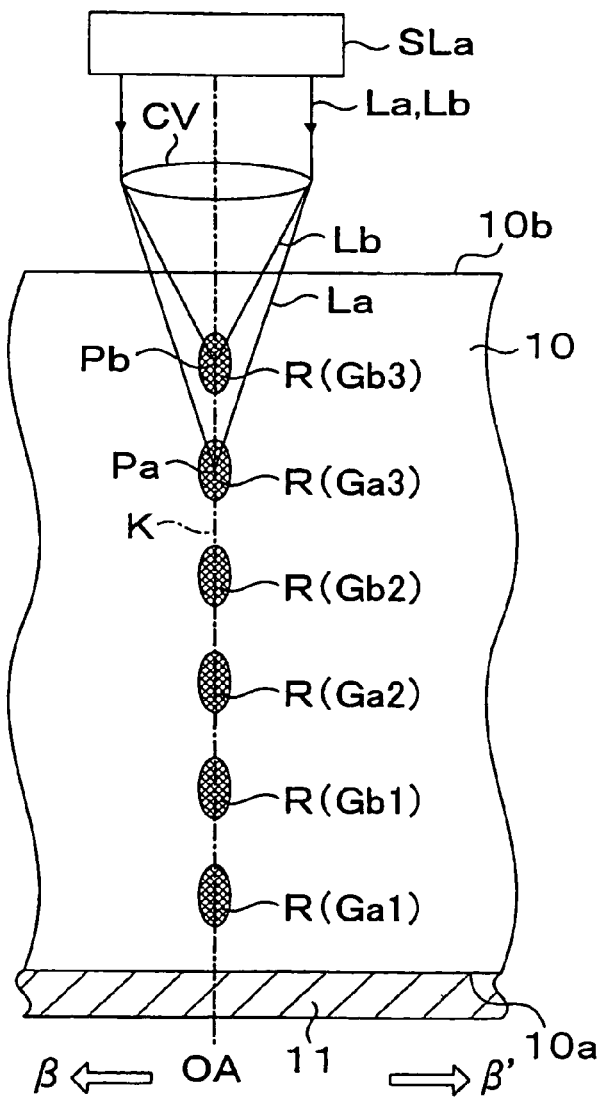
Figure 2:
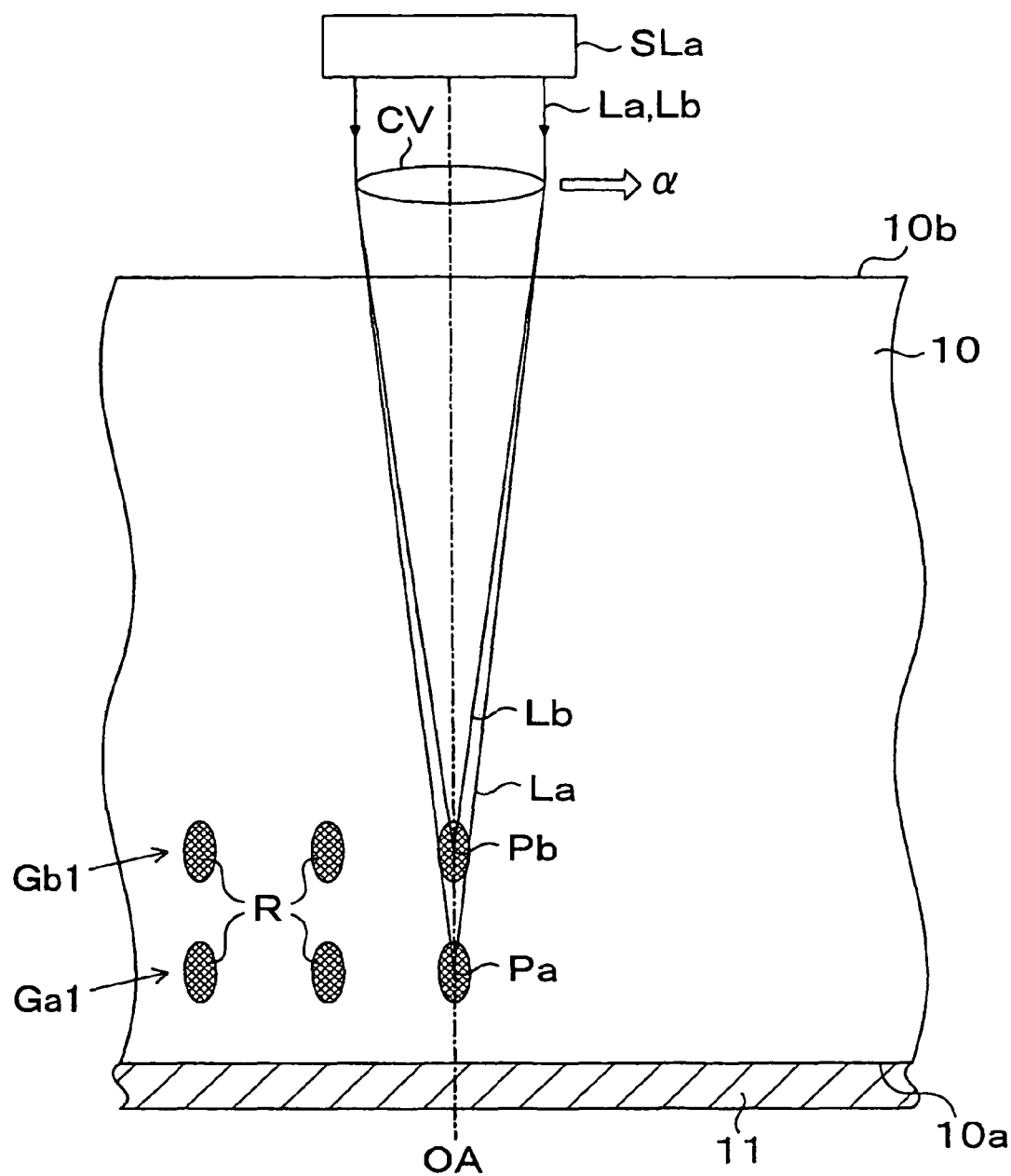
FIG. 2 is a sectional view taken in the line Y-Y of FIG. 1A equivalent to estimated cut line K.
Figure 3:
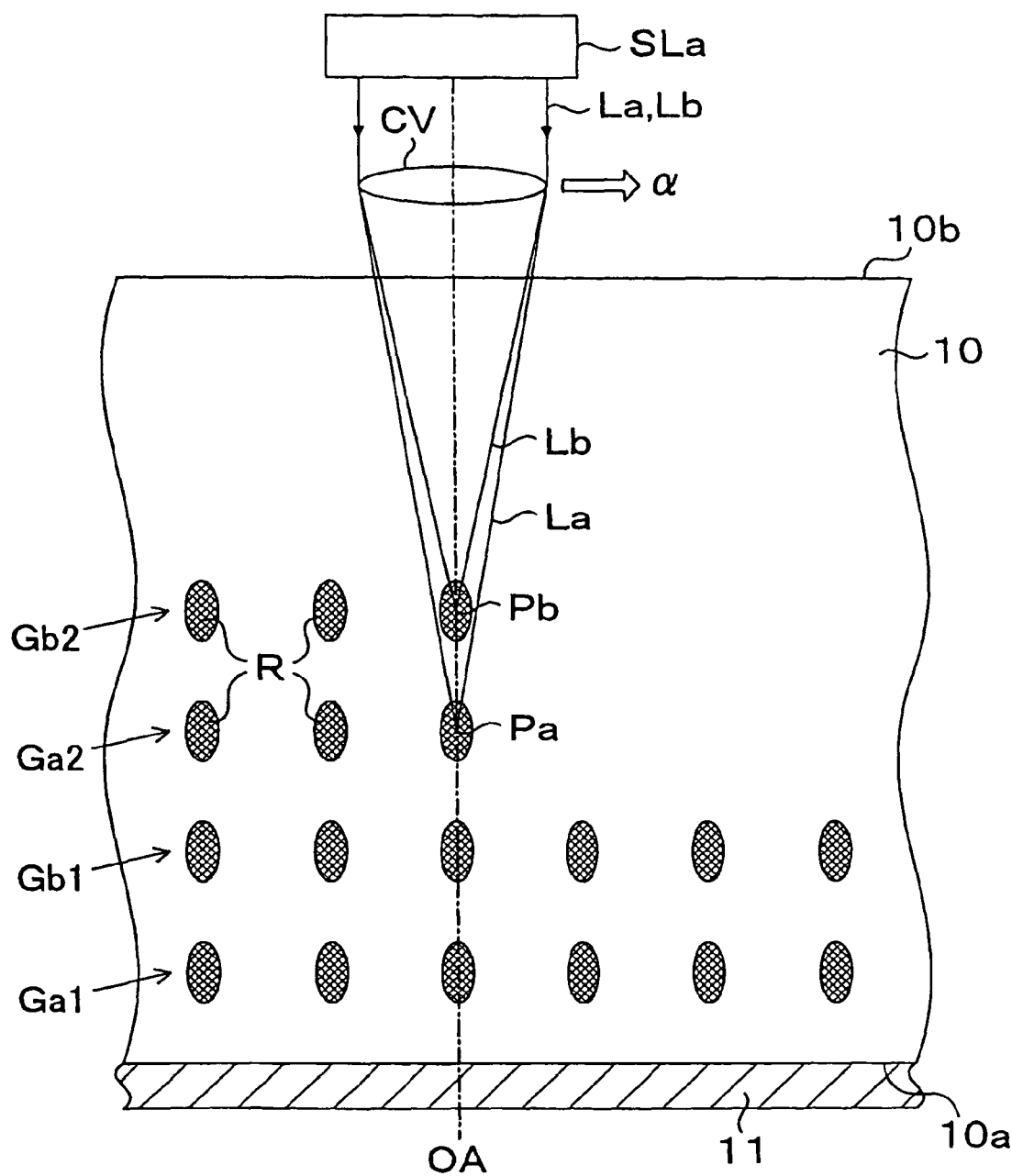
FIG. 3 is a sectional view taken in the line Y-Y of FIG. 1A equivalent to estimated cut line K.
Figure 4:
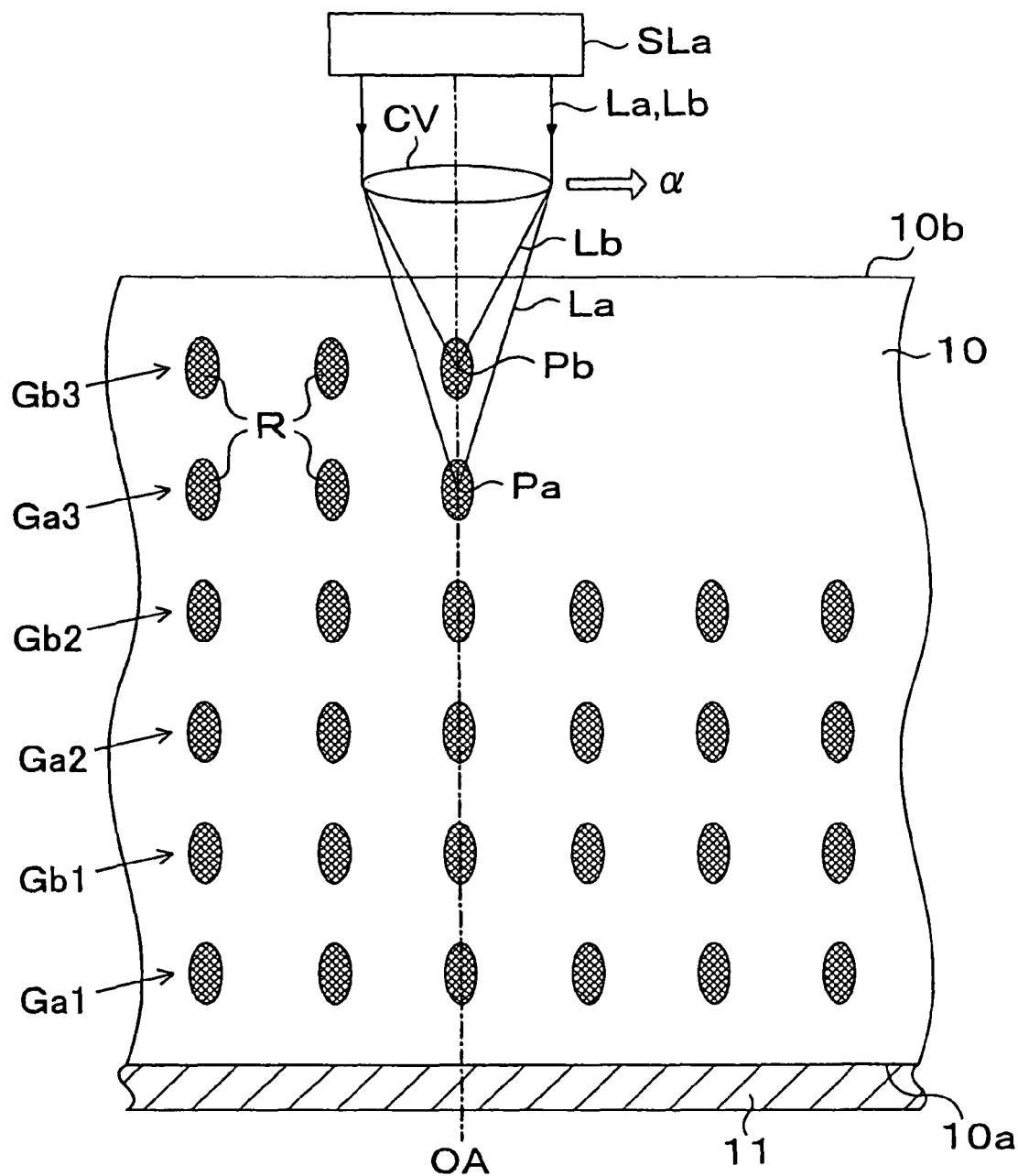
FIG. 4 is a sectional view taken in the line Y-Y of FIG. 1A equivalent to estimated cut line K.

FIGS. 1A, 1B, and 2 through 4 illustrate processes to radiate a laser beam to a wafer 10 and form a modifying region according to a first embodiment. FIG. 1A shows a plan view of the wafer 10. FIGS. 1B and 2 through 4 schematically show longitudinal sectional views of the wafer 10. FIG. 1B is a sectional view taken in the line X-X of FIG. 1A. FIGS. 2 through 4 are sectional views taken in the line Y-Y of FIG. 1A equivalent to estimated cut line K.

A wafer (bulk silicon wafer) 10 is made of a bulk monocrystalline silicon material. A reverse side 10a of the wafer 10 is attached with a dicing film (dicing sheet, dicing tape, and expand tape) 11. The dicing film 11 is made of an expansible plastic film material that expands by heating or applying a force in an expanding direction. The dicing film 11 is bonded to all over the reverse side of the wafer 10 with an adhesive (not shown).

<Process 1: See FIG. 2>

The laser processing apparatus is provided with one laser light source SLa and one condenser lens CV. The laser light source SLa simultaneously generates and radiates laser beams La and Lb with two wavelengths λa and λb.

An optical axis OA for the laser beams La and Lb is kept perpendicular to a surface 10b of the wafer 10. In this state, the laser beams La and Lb are radiated to the surface 10b (incidence plane for the laser beams La and Lb) of the wafer 10 through a condenser lens CV. The laser beam L is converged on focusing points (focuses) Pa and Pb. These focusing points are then aligned to specified positions in the wafer 10. As a result, radiation of the laser beams La and Lb forms a modifying region (modifying layer) R at focusing points Pa and Pb in the wafer 10.

Increasing the laser beam wavelength deepens a depth position of the focusing point in the wafer. Modifying region R is formed far from the surface 10b of the wafer 10. In other words, increasing the laser beam wavelength also increases a distance from the laser beam's incident surface (surface 10b of the wafer 10) to the focusing point. Modifying region R is formed in the wafer 10 far from the laser beam's incidence plane. Depth positions of focusing points Pa and Pb in the wafer 10 are equivalent to distances from the surface 10b (incidence plane for the laser beams La and Lb) of the wafer 10 to focusing points Pa and Pb.

When wavelength λa of laser beam La is set to be greater than wavelength λb of laser beam Lb (λb<λa), the depth position of focusing point Pa for laser beam La can be deeper than that of focusing point Pb for laser beam Lb. For example, let us suppose that a YAG (Yttrium Aluminum Garnet) laser is used for laser beams La and Lb. In such case, it is only necessary to set wavelength λa of laser beam La to 1319 nm and wavelength λb of laser beam Lb to 1064 nm.

Modifying region R includes a melt treatment region mainly due to the multiphoton absorption generated by radiation of laser beams La and Lb. That is, the multiphoton absorption due to laser beams La and Lb locally heats locations corresponding to focusing points Pa and Pb in the wafer 10. The heated location is once melt and then rehardens. In this manner, a region that is melt and then rehardens in the wafer 10 becomes modifying region R. The melt treatment region signifies a region where a phase or a crystal structure changes. In other words, the melt treatment region is one of the regions where, in the wafer 10, monocrystalline silicon changes to amorphous silicon; monocrystalline silicon changes to polycrystal silicon; and monocrystalline silicon changes to a structure containing amorphous silicon and polycrystal silicon. Since the wafer 10 is a bulk silicon wafer, the melt treatment region is chiefly made of polycrystal silicon.

The melt treatment region is formed mainly by the multiphoton absorption, not by absorption of laser beams La and Lb in the wafer 10 (i.e., normal heating by a laser beam). Accordingly, laser beams La and Lb are scarcely absorbed in locations other than focusing points Pa and Pb in the wafer 10. This prevents the surface 10b of the wafer 10 from being melted or deformed.

The laser processing apparatus radiates pulsed laser beams La and Lb for scanning by keeping the constant depth positions for focusing points Pa and Pb in the wafer 10. The laser processing apparatus moves focusing points Pa and Pb in the direction of arrow α in FIG. 2 along straight estimated cut line K for the wafer 10.

In addition, the laser processing apparatus may keep constant positions for radiating laser beams La and Lb without scanning these laser beams. In this state, it may be preferable to move a mounting base (not shown) for mounting the wafer 10 in a direction orthogonal to the radiation direction of laser beams La and Lb. This direction is equivalent to the incident direction of laser beams La and Lb with reference to the surface 10b of the wafer 10. That is, the laser processing apparatus may scan laser beams La and Lb or move the wafer 10 to move focusing points Pa and Pb relatively to the wafer 10 along estimated cut line K for the wafer 10.

In this manner, the laser processing apparatus settles the depth positions for focusing points Pa and Pb in the wafer 10 near the reverse side 10a of the wafer 10. In this state, the laser processing apparatus radiates pulsed laser beams La and Lb and moves focusing points Pa and Pb relatively to the wafer 10. The laser processing apparatus simultaneously forms a set of 2-layer modifying region groups Ga1 and Gb1 at constant depth positions from the surface 10b of the wafer 10. The depth positions correspond to given distances from the incidence plane for laser beams La and Lb toward the inside. Each modifying region group includes multiple modifying regions R horizontally located at a specified interval with reference to the surface 10b and the reverse side 10a of the wafer 10.

<Process 2: See FIG. 3>

The laser processing apparatus then settles depth positions for focusing points Pa and Pb in the wafer 10 approximately at a middle between the surface 10b and the reverse side 10a of the wafer 10. In this state, the laser processing apparatus radiates pulsed laser beams La and Lb and moves focusing points Pa and Pb relatively to the wafer 10. The laser processing apparatus simultaneously forms a set of 2-layer modifying region groups Ga2 and Gb2. Each modifying region group includes multiple modifying regions R horizontally located at a specified interval with reference to the surface 10b and the reverse side 10a of the wafer 10.

<Process 3: See FIG. 4>

The laser processing apparatus then settles the depth positions for focusing points Pa and Pb in the wafer 10 near the surface 10b of the wafer 10. In this state, the laser processing apparatus radiates pulsed laser beams La and Lb and moves focusing points Pa and Pb relatively to the wafer 10. The laser processing apparatus simultaneously forms a set of 2-layer modifying region groups Ga3 and Gb3. Each modifying region group includes multiple modifying regions R horizontally located at a specified interval with reference to the surface 10b and the reverse side 10a of the wafer 10.

Multiple modifying regions R are formed at focusing point Pa for laser beam La and constitute modifying region groups Ga1, Ga2, and Ga3. Multiple modifying regions R are formed at focusing point Pb for laser beam Lb and constitute modifying region groups Gb1, Gb2, and Gb3. The sets of modifying region groups include the bottom set of modifying region groups Ga1 and Gb1, the middle set of modifying region groups Ga2 and Gb2, and the top set of modifying region groups Ga3 and Gb3. These sets of modifying region groups are separated, adjoined, or overlapped with each other in the depth direction from the surface 10b of the wafer 10. The depth direction is equivalent to the thickness direction of the wafer 10, the section direction thereof, and the direction orthogonal to the surface 10b and the reverse side 10a thereof.

<Process 4: See FIG. 1B> The laser processing apparatus forms three sets of 6-layer modifying region groups Ga1, Gb1, Ga2, Gb2, Ga3, and Gb3 in the wafer 10. The apparatus applies a tensile stress to each modifying region group by expanding the dicing film 11 horizontally (indicated by arrows β and β') against the estimated cut line.

As a result, a shear stress occurs in the wafer 10. A crack occurs first in the depth direction of the wafer 10 at the bottom-layer modifying region group Ga1 as an origin nearest to the dicing film 11. Another crack then occurs in the depth direction of the wafer 10 at the modifying region group Gb1 above Ga1 as an origin. Still another crack occurs in the depth direction of the wafer 10 at the modifying region group Ga2 above Gb1 as an origin. Likewise, cracks occur in the depth direction of the wafer 10 at modifying region groups Ga1 through Gb3 as origins. These cracks at modifying region groups Ga1 through Gb3 as origins develop to link together. The developed crack reaches the surface 10b and the reverse side 10a of the wafer 10 to cut and separate the wafer 10.

Modifying region groups Ga1 through Gb3 are formed along estimated cut line K. It is a good practice to expand the dicing film 11 and appropriately apply a tensile stress to modifying region groups Ga1 through Gb3. This causes a tear at each modifying region R constituting three sets or 6-layer modifying region groups Ga1 through Gb3. Modifying region R works as an origin for cutting. In this manner, it is possible to accurately cut and separate the wafer 10 with a relatively small force without causing an unnecessary crack in the wafer 10.

Many chips (not shown) are laid out in a grid pattern on the surface 10b of the thin and approximately circular disk-shaped wafer 10. The estimated cut line is provided between chips. That is, multiple estimated cut lines are laid out in a grid pattern on the surface 10b of the wafer 10. After modifying region groups Ga1 through Gb3 are formed for each estimated cut line, expanding the dicing film 11 can cut and separate the wafer 10 into chips.

<Operations and Working Effects of the First Embodiment>

The first embodiment can provide the following operations and working effects.

<1-1> The first embodiment uses one laser light source SLa that simultaneously generates and radiates laser beams La and Lb with two wavelengths λa and λb. The first embodiment gradually changes depth positions of focusing points Pa and Pb for laser beams La and Lb in the wafer 10. The first embodiment successively forms three sets or 6-layer modifying region groups Ga1 through Gb3. One set of modifying region groups constitutes two layers and is formed at a time. The modifying region groups are separated, adjoined, or overlapped with each other along estimated cut line K of the wafer 10 in the depth direction from the surface 10b thereof.

In other words, the first embodiment radiates laser beams La and Lb to the wafer 10 at stepwise varied multiple positions (depth positions) for focusing points Pa and Pb of laser beams La and Lb in the incident direction (depth direction) against the wafer 10. The first embodiment forms multiple modifying regions R constituting three sets or 6-layer modifying region groups Ga1 through Gb3 so as to be separated, adjoined, or overlapped with each other along the incident direction.

The first embodiment simultaneously radiates laser beams La and Lb with two wavelengths λa and λb to the wafer 10. In this manner, the first embodiment simultaneously forms modifying regions R constituting 2-layer modifying region groups (Ga1 and Gb1, Ga2 and Gb2, and Ga3 and Gb3) with different depths corresponding to laser beams La and Lb. Accordingly, the first embodiment provides a higher processing efficiency than the technology in patent document 2 that forms one modifying region with a different depth at a time. The embodiment can reliably form multiple layers of normal modifying region groups Ga1 through Gb3 in a short period of time. The embodiment provides high throughput and is suitable for mass production.

The first embodiment uses only one laser light source SLa. The embodiment can further miniaturize the laser processing apparatus than the technology in patent document 3 that provides a laser light source for each of laser beams with different wavelengths. The embodiment reduces the installation space. In addition, the embodiment simplifies the laser processing apparatus, making it possible to decrease the number of parts and decrease manufacturing costs.

<1-2> The first embodiment forms six layers of modifying region groups Ga1 through Gb3. The number of layers for the modifying region group may be appropriately specified depending on the thickness of the wafer 10. It may be preferable to form a modifying region group having four layers or less or eight layers or more.

<1-3> The first embodiment uses the laser light source SLa (laser light source capable of simultaneous two-wavelength oscillation) that simultaneously radiates laser beams La and Lb with two wavelengths λa and λb. The embodiment simultaneously forms modifying regions R constituting 2-layer modifying region groups (Ga1 and Gb1, Ga2 and Gb2, or Ga3 and Gb3). Further, the embodiment may use a laser light source that simultaneously generates and radiates laser beams with three or more wavelengths. The embodiment may simultaneously form modifying regions R constituting a modifying region group having three layers or more.

Wavelengths λa and λb of laser beams La and Lb are not limited to 1319 nm for λa and 1064 nm for λb as mentioned above. It may be preferable to experimentally find an optimal value with a cut-and-try approach so as to fully provide the above-mentioned operations and working effects.

<1-4> It is preferable to form 6-layer modifying region groups Ga1 through Gb3 in the order of Ga1 and Gb1, Ga2 and Gb2, and Ga3 and Gb3 as mentioned above. That is, the formation preferably starts from the modifying region group farthest from the surface 10b (incidence plane for laser beams La and Lb) of the wafer 10 where laser beams La and Lb are incident.

For example, let us suppose to first form modifying region groups Ga3 and Gb3, and then form modifying region groups Ga1 and Gb1. Modifying region groups Ga3 and Gb3 are located near to the surface 10b of the wafer 10 where laser beams La and Lb are incident. Ga1 and Gb1 are located far from the surface 10b. The first formed modifying region groups Ga3 and Gb3 scatter laser beams La and Lb radiated during formation of modifying region groups Ga1 and Gb1. This causes irregular sizes of modifying regions R constituting modifying region groups Ga1 and Gb1. Modifying region groups Ga1 and Gb1 cannot be formed uniformly.

By contrast, the first embodiment forms modifying region groups Ga1 through Gb3 in order starting from the farthest from the surface 10b (incidence plane for laser beams La and Lb) of the wafer 10 where laser beams La and Lb are incident. It is possible to form new modifying region R with no modifying region R between the incidence plane of the surface 10b and focusing points Pa and Pb. The already formed modifying region R does not scatter laser beams La and Lb. It is possible to uniformly form 6-layer modifying region groups Ga1 through Gb3.

Further, 6-layer modifying region groups Ga1 through Gb3 may be formed uniformly to some extent when they are formed orderly starting from the nearest to the surface 10b of the wafer 10 (i.e., in the order of Ga3 and Gb3, Ga2 and Gb2, and Ga1 and Gb1) or formed randomly. It may be a good practice to appropriately determine the order of forming the modifying region groups by experimentally confirming an actually formed modifying region group.

The following methods are available to form multiple layers of modifying region groups Ga1 through Gb3 by changing depth positions of focusing points Pa and Pb in the wafer 10: <a> Vertically moving laser light source SLa for radiating laser beams La and Lb and a head (laser head) including condenser lens CV up and down with reference to the surface 10b and the reverse side 10a of the wafer 10; <b> Vertically moving a mounting base for seating the wafer 10 up and down with reference to the surface 10b and the reverse side 10a of the wafer 10; and <c> Combining methods <a> and <b> to move the head and the mounting base up and down reversely to each other. This method can form multiple layers of modifying region groups Ga through Gc faster than methods <a> and <b>.

2. Second Embodiment

Figure 5:
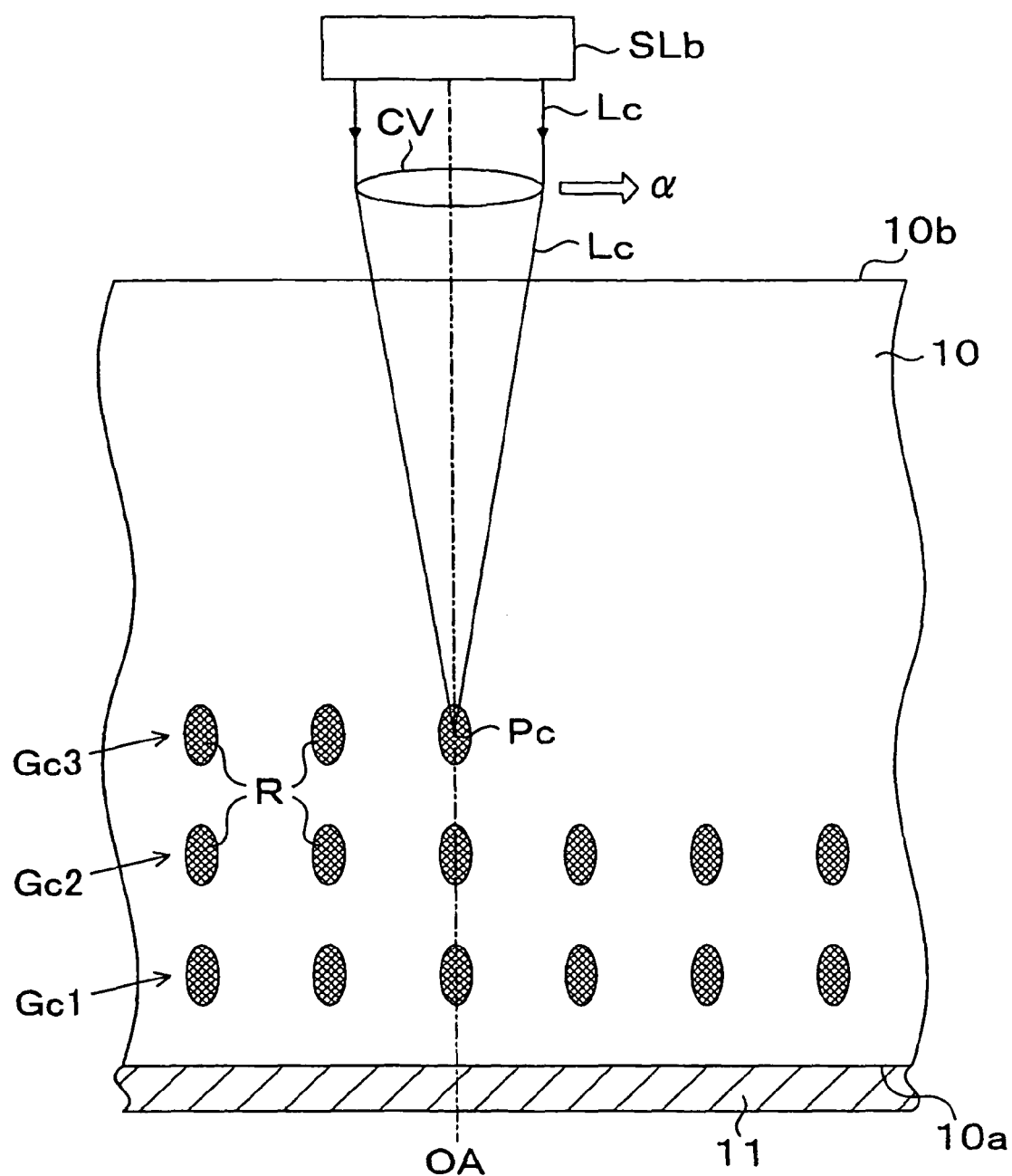
FIGS. 5 and 6 schematically show longitudinal sectional views of a wafer according to a second embodiment.
Figure 6:
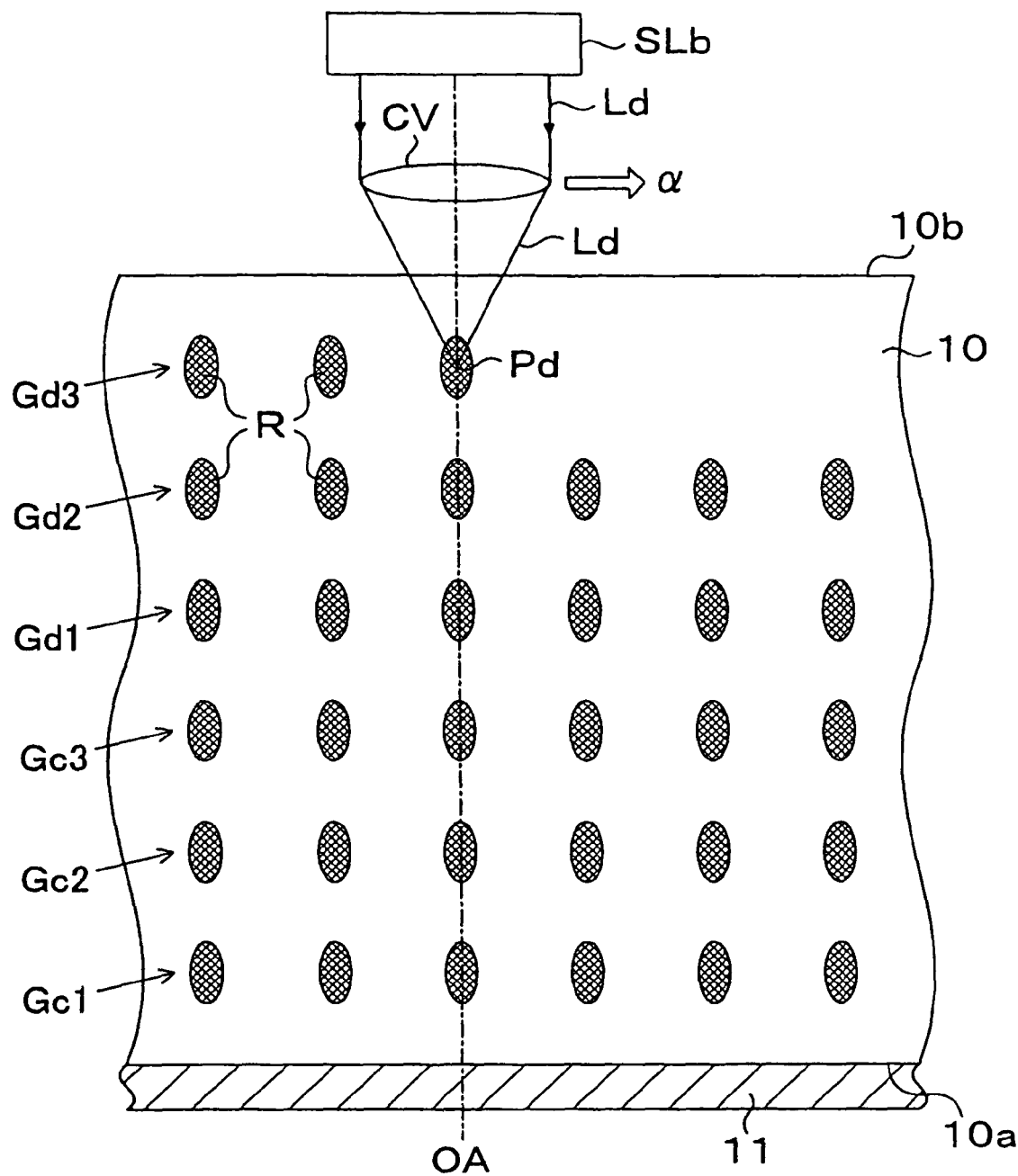

FIGS. 5 and 6 illustrate processes to radiate a laser beam to the wafer 10 and form a modifying region according to a second embodiment. FIGS. 5 and 6 schematically show longitudinal sectional views of the wafer according to the second embodiment.

<Process 1: See FIG. 5>

The laser processing apparatus is provided with one laser light source SLb and one condenser lens CV The laser light source SLb selects one of a laser beam Lc with wavelength λc and a laser beam Lc with wavelength λd. The laser light source SLb then generates to radiate the laser beam with the selected wavelength.

The laser processing apparatus allows laser light source SLb to radiate laser beam Lc with wavelength λc. Optical axis OA for laser beam Lc is kept perpendicular to the surface 10b of the wafer 10. In this state, laser beam Lc is radiated to the surface 10b (incidence plane for the laser beam Lc) of the wafer 10 via condenser lens CV. Laser beam Lc is converged on focusing point Pc, i.e., a specified position in the wafer 10. Modifying region R is formed at focusing point Pc in the wafer 10 as a result of radiation of laser beam Lc.

The laser processing apparatus settles a depth position for focusing point Pc in the wafer 10 near the reverse side 10a of the wafer 10. In this state, the laser processing apparatus radiates pulsed laser beam Lc and moves focusing point Pc relatively to the wafer 10. The laser processing apparatus forms one-layer modifying region group Gc1 at a specified depth position from the surface 10b of the wafer 10 (i.e., at a specified position inside from the incidence plane for laser beam Lc). Modifying region group Gc1 is composed of multiple modifying regions R generated at a specified interval horizontally with reference to the surface 10b and the reverse side 10a of the wafer 10.

The laser processing apparatus gradually changes the depth position for focusing point Pc in the wafer 10. The laser processing apparatus successively forms 3-layer modifying region groups Gc1 through Gc3 upward from near the reverse side 10a of the wafer 10. The modifying region groups are separated, adjoined, or overlapped with each other along estimated cut line K of the wafer 10 in the depth direction from the surface 10b thereof.

<Process 2: See FIG. 6>

The laser processing apparatus allows laser light source SLb to radiate laser beam Ld with wavelength λd. Optical axis OA for laser beam Ld is kept perpendicular to the surface 10b of the wafer 10. In this state, laser beam Ld is radiated to the surface 10b (incidence plane for the laser beam Ld) of the wafer 10 via condenser lens CV Laser beam Ld is converged on focusing point Pd, i.e., a specified position in the wafer 10. Modifying region R is formed at focusing point Pd in the wafer 10 as a result of radiation of laser beam Ld.

The laser processing apparatus settles the depth position for focusing point Pd in the wafer 10 to a specified position over modifying region group Gc3. In this state, the laser processing apparatus radiates pulsed laser beam Ld and moves focusing point Pd relatively to the wafer 10. The laser processing apparatus forms one-layer modifying region group Gd1 at a specified depth position from the surface 10b of the wafer 10 (i.e., at a specified position inside from the incidence plane for laser beam Ld). Modifying region group Gd1 is composed of multiple modifying regions R generated at a specified interval horizontally with reference to the surface 10b and the reverse side 10a of the wafer 10.

The laser processing apparatus gradually changes the depth position for focusing point Pd in the wafer 10. The laser processing apparatus successively forms 3-layer modifying region groups Gd1 through Gd3 from over modifying region group Gc3 toward the surface 10b of the wafer 10. The modifying region groups are separated, adjoined, or overlapped with each other along estimated cut line K of the wafer 10 in the depth direction from the surface 10b thereof.

<Process 3>

Similarly to process 3 in the first embodiment, the dicing film 11 is expanded horizontally with reference to estimated cut line K. A tensile stress is applied to modifying region groups Gc1 through Gc3 and Gd1 through Gd3 in the wafer 10.

As a result, a shear stress occurs in the wafer 10. A crack occurs first in the depth direction of the wafer 10 at the bottom-layer modifying region group Gc1 as an origin nearest to the dicing film 11. Another crack then occurs in the depth direction of the wafer 10 at the modifying region group Gc2 above Gc1 as an origin. Still another crack occurs in the depth direction of the wafer 10 at the modifying region group Gc3 above Gc2 as an origin. Yet still another crack occurs in the depth direction of the wafer 10 at the modifying region group Gd1 above Gc3 as an origin. Likewise, cracks occur in the depth direction of the wafer 10 at modifying region groups Gc1 through Gd3 as origins. These cracks at modifying region groups Gc1 through Gd3 as origins develop to link together. The developed crack reaches the surface 10b and the reverse side 10a of the wafer 10 to cut and separate the wafer 10.

Modifying region groups Gc1 through Gd3 are formed along estimated cut line K. It is a good practice to expand the dicing film 11 and appropriately apply a tensile stress to modifying region groups Gc1 through Gd3. This causes a tear at each modifying region R constituting 6-layer modifying region groups Gc1 through Gd3. Modifying region R works as an origin for cutting. In this manner, it is possible to accurately cut and separate the wafer 10 with a relatively small force without causing an unnecessary crack in the wafer 10.

<Operations and Working Effects of the Second Embodiment>

The second embodiment can provide the following operations and working effects.

<2-1> The second embodiment uses one laser light source SLb that selects one of laser beams Lc and Ld with two wavelengths λc and λd and radiates the selected laser beam. Process 1 (FIG. 5) forms modifying region R at deep locations from the surface 10b of the wafer 10. The embodiment radiates laser beam Lc with wavelength λc to focusing point Pc inside from the surface 10b of the wafer 10. The embodiment forms each modifying region R constituting 3-layer modifying region groups Gc1 through Gc3. Process 2 (FIG. 6) forms modifying region R at shallow locations from the surface 10b of the wafer 10. The embodiment radiates laser beam Ld with wavelength λd to focusing point Pd inside from the surface 10b of the wafer 10. The embodiment forms each modifying region R constituting 3-layer modifying region groups Gd1 through Gd3.

Setting wavelength Lc of laser beam Lc to a sufficiently large value can apply wavelength Lc to a deep location from the surface 10b of the wafer 10. Normal modifying region R can be reliably formed at the deep location. Setting wavelength Ld of laser beam Ld to a sufficiently small value can apply wavelength Lc to a shallow location from the surface 10b of the wafer 10. Normal modifying region R can be reliably formed at the shallow location. Wavelength λc becomes greater than λd (λc>λd). It may be preferable to experimentally find optimal values for wavelengths λc and λd with a cut-and-try approach in consideration for materials and thicknesses of the wafer 10.

The second embodiment uses only one laser light source SLb. The embodiment can further miniaturize the laser processing apparatus than the technology in patent document 3 that provides the laser light source for each of laser beam with different wavelengths. The embodiment reduces the installation space. In addition, the embodiment simplifies the laser processing apparatus, making it possible to decrease the number of parts and decrease manufacturing costs.

<2-2> The second embodiment forms six layers of modifying region groups Gc1 through Gd3. The number of layers for the modifying region group may be appropriately specified depending on the thickness of the wafer 10. It may be preferable to form a modifying region group having four layers or less or eight layers or more.

<2-3> The second embodiment uses the laser light source SLb (laser light source capable of two-wavelength selectable oscillation) that selectively radiates laser beams Lc and Ld with two wavelengths λc and λd. The embodiment selects optimal wavelength λc or λd for two locations, deep and shallow, from the surface 10b of the wafer 10.

Further, it may be preferable to use a laser light source that generates and radiates a laser beam with a wavelength selected from three wavelengths. An optimal wavelength may be selectively applied to three locations, deep, shallow, and intermediate, from the surface 10b of the wafer 10. Moreover, it may be preferable to use a laser light source that generates and radiates a laser beam with a wavelength selected from four or more wavelengths. An optimal wavelength may be selectively applied to multiple portions divided from a depth from the surface 10b of the wafer 10.

<2-4> It is preferable to form 6-layer modifying region groups Gc1 through Gd3 in the order of Gc1, Gc2, Gc3, Gd1, Gd2, and Gd3 as mentioned above. That is, the formation preferably starts from the modifying region group farthest from the surface 10b (incidence plane for laser beams Lc and Ld) of the wafer 10 where laser beams Lc and Ld are incident. The reason is the same as described in <1-4> for the first embodiment.

Further, 6-layer modifying region groups Gc1 through Gd3 may be formed uniformly to some extent when they are formed orderly starting from the nearest to the surface 10b of the wafer 10 (i.e., in the order of Gd3, Gd2, Gd1, Gc3, Gc2, and Gc1) or formed randomly. It may be a good practice to appropriately determine the order of forming the modifying region groups by experimentally confirming an actually formed modifying region group.

3. Third Embodiment

Figure 7:
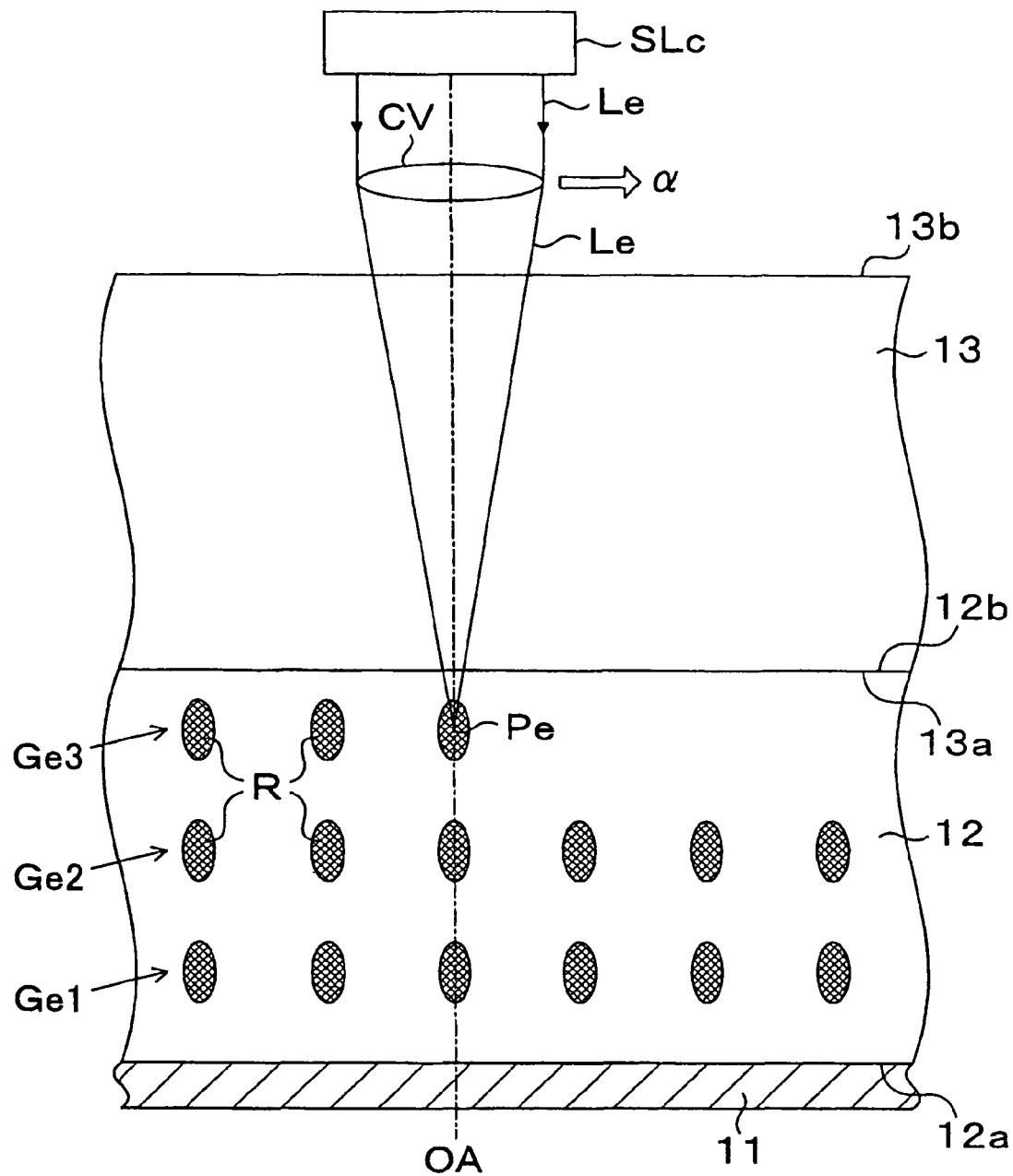
FIGS. 7 and 8 schematically show longitudinal sectional views of a two-layer wafer according to a third embodiment.
Figure 8:
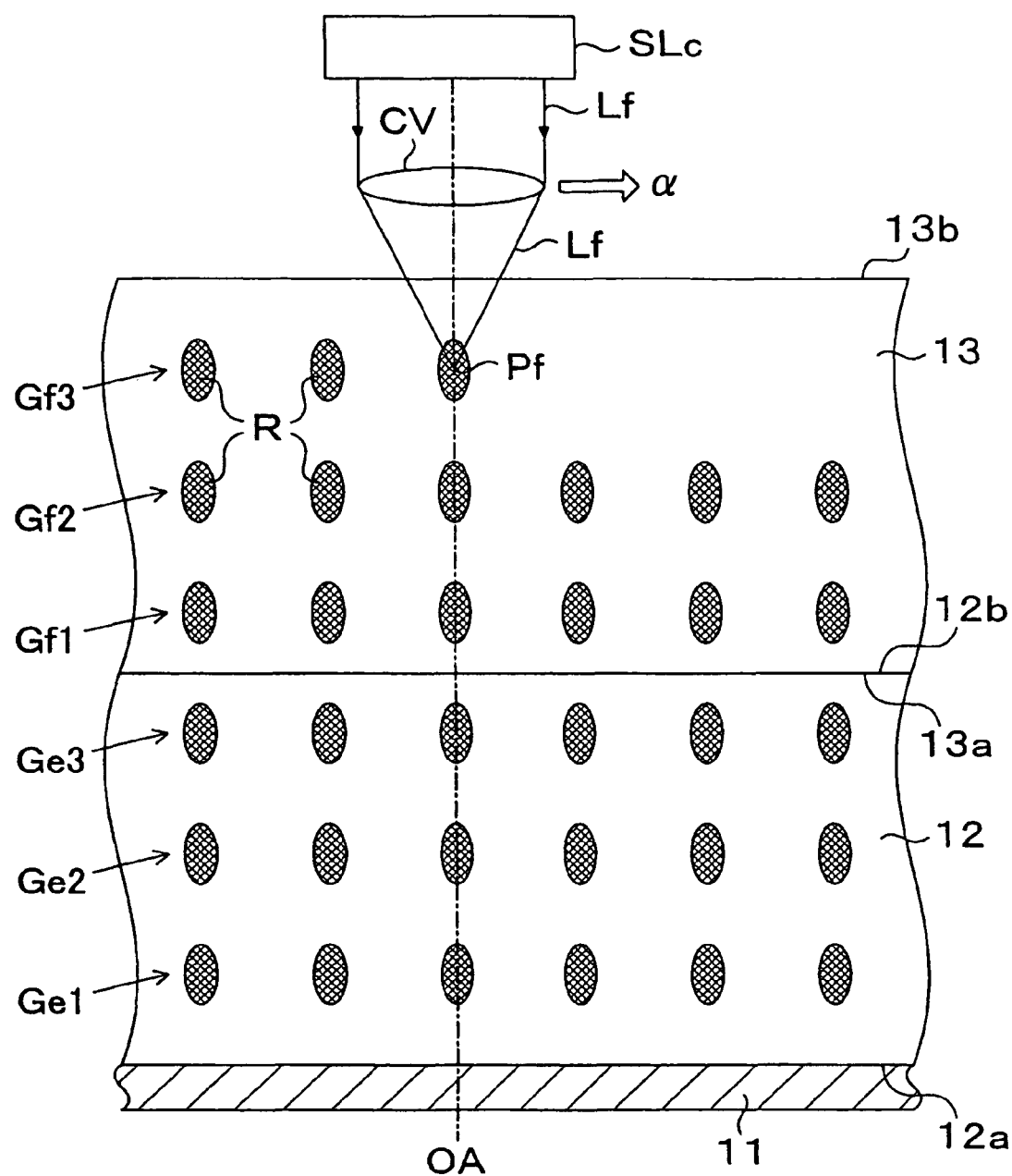

FIGS. 7 and 8 illustrate processes to radiate a laser beam to the wafers 12 and 13 and form a modifying region according to a third embodiment. FIGS. 7 and 8 schematically show longitudinal sectional views of the wafers 12 and 13 according to the third embodiment.

The wafers (bulk silicon wafer) 12 and 13 are made of a bulk monocrystalline silicon material. The dicing film 11 is bonded to a reverse side 12a of the wafer 12. The wafer 13 is layered on a surface 12b of the wafer 10. The surface 12b of the wafer 12 and the reverse side 13a of the wafer 13 are bonded to form a two-layer structure.

<Process 1: See FIG. 7>

The laser processing apparatus is provided with one laser light source SLc and one condenser lens CV The laser light source SLc selects one of laser beam Le with wavelength λe and laser beam Lf with wavelength λf. The laser light source SLc then generates to radiate the laser beam with the selected wavelength.

The laser processing apparatus allows laser light source SLc to radiate laser beam Le with wavelength λe. Optical axis OA for laser beam Le is kept perpendicular to the surface 13b of the wafer 13. In this state, laser beam Le is radiated to the surface 13b (incidence plane for the laser beam Le) of the wafer 13 via condenser lens CV Laser beam Le is converged on focusing point Pe, i.e., a specified position in the wafer 12. Modifying region R is formed at focusing point Pe in the wafer 12 as a result of radiation of laser beam Le.

The laser processing apparatus settles a depth position for focusing point Pe in the wafer 12 near the reverse side 12a of the wafer 12. In this state, the laser processing apparatus radiates pulsed laser beam Le and moves focusing point Pe relatively to the wafer 12. The laser processing apparatus forms one-layer modifying region group Ge1 at a specified depth position from the surface 12b of the wafer 12 (i.e., at a specified position inside from the incidence plane for laser beam Le). Modifying region group Ge1 is composed of multiple modifying regions R generated at a specified interval horizontally with reference to the surface 12b and the reverse side 12a of the wafer 12.

The laser processing apparatus gradually changes the depth position for focusing point Pe in the wafer 12. The laser processing apparatus successively forms 3-layer modifying region groups Ge1 through Ge3 along estimated cut line K of the wafer 12. The groups are arranged in the depth direction from the surface 12b of the wafer 12 so as to be separated, adjoined, or overlapped with each other.

<Process 2: See FIG. 8>

The laser processing apparatus allows laser light source SLc to radiate laser beam Lf with wavelength λf. Optical axis OA for laser beam Lf is kept perpendicular to the surface 13b of the wafer 13. In this state, laser beam Lf is radiated to the surface 13b (incidence plane for the laser beam Lf) of the wafer 13 via condenser lens CV. Laser beam Lf is converged on focusing point Pf, i.e., a specified position in the wafer 13. Modifying region R is formed at focusing point Pf in the wafer 13 as a result of radiation of laser beam Lf.

The laser processing apparatus settles a depth position for focusing point Pf in the wafer 13 near the reverse side 13a of the wafer 13. In this state, the laser processing apparatus radiates pulsed laser beam Lf and moves focusing point Pf relatively to the wafer 13. The laser processing apparatus forms one-layer modifying region group Gf1 at a specified depth position from the surface 13b of the wafer 13 (i.e., at a specified position inside from the incidence plane for laser beam Lf). Modifying region group Gf1 is composed of multiple modifying regions R generated at a specified interval horizontally with reference to the surface 13b and the reverse side 13a of the wafer 13.

The laser processing apparatus gradually changes the depth position for focusing point Pf in the wafer 13. The laser processing apparatus successively forms 3-layer modifying region groups Gf1 through Gf3 along estimated cut line K of the wafer 13. The groups are arranged in the depth direction from the surface 13b of the wafer 13 so as to be separated, adjoined, or overlapped with each other.

<Process 3>

The dicing film 11 is expanded horizontally with reference to estimated cut line K to apply a tensile stress to modifying region groups Ge1 through Ge3 and Gf1 through Gf3 in the wafer 10. According to the examples in FIGS. 7 and 8, the dicing film 11 is expanded vertically when viewed on the corresponding pages.

A shear stress occurs in the wafer 12. A crack occurs first in the depth direction of the wafer 12 at the bottom-layer modifying region group Ge1 as an origin nearest to the dicing film 11. Another crack then occurs in the depth direction of the wafer 12 at the modifying region group Ge2 above Ge1 as an origin. Still another crack occurs in the depth direction of the wafer 12 at the modifying region group Ge3 above Ge2 as an origin. These cracks at modifying region groups Ge1 through Ge3 as origins develop to link together. The developed crack reaches the surface 12b and the reverse side 12a of the wafer 12 to cut and separate the wafer 12.

A shear stress occurs in the wafer 13. A crack occurs first in the depth direction of the wafer 13 at the bottom-layer modifying region group Gf1 as an origin nearest to the dicing film 11. Another crack then occurs in the depth direction of the wafer 13 at the modifying region group Gf2 above Gf1 as an origin. Still another crack occurs in the depth direction of the wafer 13 at the modifying region group Gf3 above Gf2 as an origin. These cracks at modifying region groups Gf1 through Gf3 as origins develop to link together. The developed crack reaches the surface 13b and the reverse side 13a of the wafer 13 to cut and separate the wafer 13.

Modifying region groups Ge1 through Gf3 are formed along estimated cut line K. It is a good practice to expand the dicing film 11 and appropriately apply a tensile stress to modifying region groups Ge1 through Gf3. This causes a tear at each modifying region R constituting 6-layer modifying region groups Ge1 through Gf3. Modifying region R works as an origin for cutting. In this manner, it is possible to accurately cut and separate the wafers 12 and 13 with a relatively small force without causing an unnecessary crack in the wafers 12 and 13.

<Operations and Working Effects of the Third Embodiment>

The third embodiment can provide the following operations and working effects.

<3-1> The third embodiment uses one laser light source SLc that selects one of laser beams Le and Lf with two wavelengths λe and λf and radiates the selected laser beam. In process 1 (FIG. 7), the embodiment radiates laser beam Le with wavelength λe from the surface 13b of the upper wafer 13 to focusing point Pe in the lower wafer 12 of the two-layer structure. In this manner, the embodiment forms modifying regions R constituting 3-layer modifying region groups Ge1 through Ge3. In process 2 (FIG. 8), the embodiment radiates laser beam Le with wavelength λe from the surface 13b of the wafer 13 to focusing point Pf therein. In this manner, the embodiment forms modifying regions R constituting 3-layer modifying region groups Gf1 through Gf3.

The wafers 12 and 13 are given different optical characteristics and therefore indicate different refractive indexes for laser beam Le. Part of laser beam Le reflects on the boundary surface between the wafers 12 and 13. The reflected light interferes with the incident light to be canceled. The energy of laser beam Le greatly attenuates at a deep portion of the wafer 12 from the incidence plane (surface 13b of the wafer 13) for laser beam Le. The deep portion is short of the energy for laser beam Le needed to generate multiphoton absorption. Modifying region R may not be formed.

When wavelength λe of laser beam Le is assigned a value appropriate for materials of the wafers 12 and 13, laser beam Le does not reflect on the boundary surface between the wafers 12 and 13. It is possible to normally and reliably form modifying regions R constituting modifying region groups Ge1 through Ge3 at a deep portion of the wafer 12 from the incidence plane (surface 13b of the wafer 13) for laser beam Le. When wavelength λf of laser beam Lf is assigned a value appropriate for a material of the wafer 13, it is possible to normally and reliably form modifying regions R constituting modifying region groups Gf1 through Gf3 in the wafer 13. It may be preferable to experimentally find optimal values for wavelengths λe and λf with a cut-and-try approach in consideration for materials and thicknesses of the wafers 12 and 13.

The third embodiment uses only one laser light source SLc. The embodiment can further miniaturize the laser processing apparatus than the technology in patent document 3 that provides one laser light source for each of laser beams with different wavelengths. The embodiment reduces the installation space. In addition, the embodiment simplifies the laser processing apparatus, making it possible to decrease the number of parts and decrease manufacturing costs.

A bonded SOI wafer includes a substrate Si layer of monocrystalline silicon, a Buried OXide (BOX) layer, and an SOI layer of monocrystalline silicon. These layers are formed in this order from the bottom to the top. There is provided an SOI structure where the substrate Si layer is formed on the buried oxide layer as an insulation layer. To fabricate a bonded SOI wafer, for example, two wafers are thermally oxidized on each bonding surface (mirror surface) to form an oxide film. The two wafers are bonded via the oxide film. Then, one of the wafers is polished to an intended thickness. The polished wafer becomes the SOI layer. The unpolished wafer becomes the substrate Si layer. The oxide film becomes the buried oxide layer.

The bonded SOI wafer shows different refractive indexes for laser beams depending on the layer materials due to different optical characteristics of the substrate Si layer, the buried oxide layer, and the SOI layer. The laser beam partially reflects on a boundary surface between the substrate Si layer and the buried oxide layer with different refractive indexes and a boundary surface between the buried oxide layer and the SOI layer with different refractive indexes. The reflected light interferes with the incident light to be canceled to attenuate the laser beam energy. Further, the incident laser beam is absorbed in the wafer. As the laser beam becomes distant from the wafer surface (incidence plane of the laser beam), the laser beam energy attenuates. As a result, even the bonded SOI wafer is subject to the problem as described in the third embodiment. The deep portion from the surface of the bonded SOI wafer is also short of the laser beam energy needed to generate multiphoton absorption. Modifying region R may not be formed.

However, the problem can be solved by applying the third embodiment to the bonded SOI wafer and providing the laser beam wavelength with a value appropriate to the substrate Si layer and the SOI layer. No laser beam reflects on the boundary surface. It is possible to normally and reliably form modifying regions constituting multiple layers of the modifying region group at a portion deep from the laser beam's incidence plane (wafer surface) in the wafer.

<3-2> The third embodiment forms 3-layer modifying region groups Ge1 through Ge3 in the wafer 12 and 3-layer modifying region groups Gf1 through Gf3 in the wafer 13. The number of layers for the modifying region group in the wafers 12 and 13 may be appropriately specified depending on materials and thicknesses of the wafers 12 and 13. It may be preferable to form two layers or less or four layers or more of a modifying region group in each of the wafers.

<3-3> The third embodiment uses the laser light source SLc (laser light source capable of two-wavelength selectable oscillation) that selectively radiates laser beams Le and Lf with two wavelengths λe and λf. The embodiment selects optimal one of wavelengths λe and λf for the two-layer wafers 12 and 13.

Further, it may be preferable to use a laser light source that generates and radiates a laser beam with a wavelength selected from three types or more of wavelengths. An optimal wavelength may be selectively applied to each of three layers or more of a multi-layer wafer.

<3-4> It is preferable to form 6-layer modifying region groups Ge1 through Gf3 in the order of Ge1, Ge2, Ge3, Gf1, Gf2, and Gf3 as mentioned above. That is, the formation preferably starts from the modifying region group farthest from the surface 13b (incidence plane for laser beams Le and Lf) of the wafer 13 where laser beams Le and Lf are incident. The reason is the same as described in <1-4> for the first embodiment.

Further, 6-layer modifying region groups Ge1 through Gf3 may be formed uniformly to some extent when they are formed orderly starting from the nearest to the surface 13b of the wafer 13 (i.e., in the order of Gf3, Gf2, Gf1, Ge3, Ge2, and Ge1) or formed randomly. It may be a good practice to appropriately determine the order of forming the modifying region groups by experimentally confirming an actually formed modifying region group.

4. Fourth Embodiment

Figure 9:
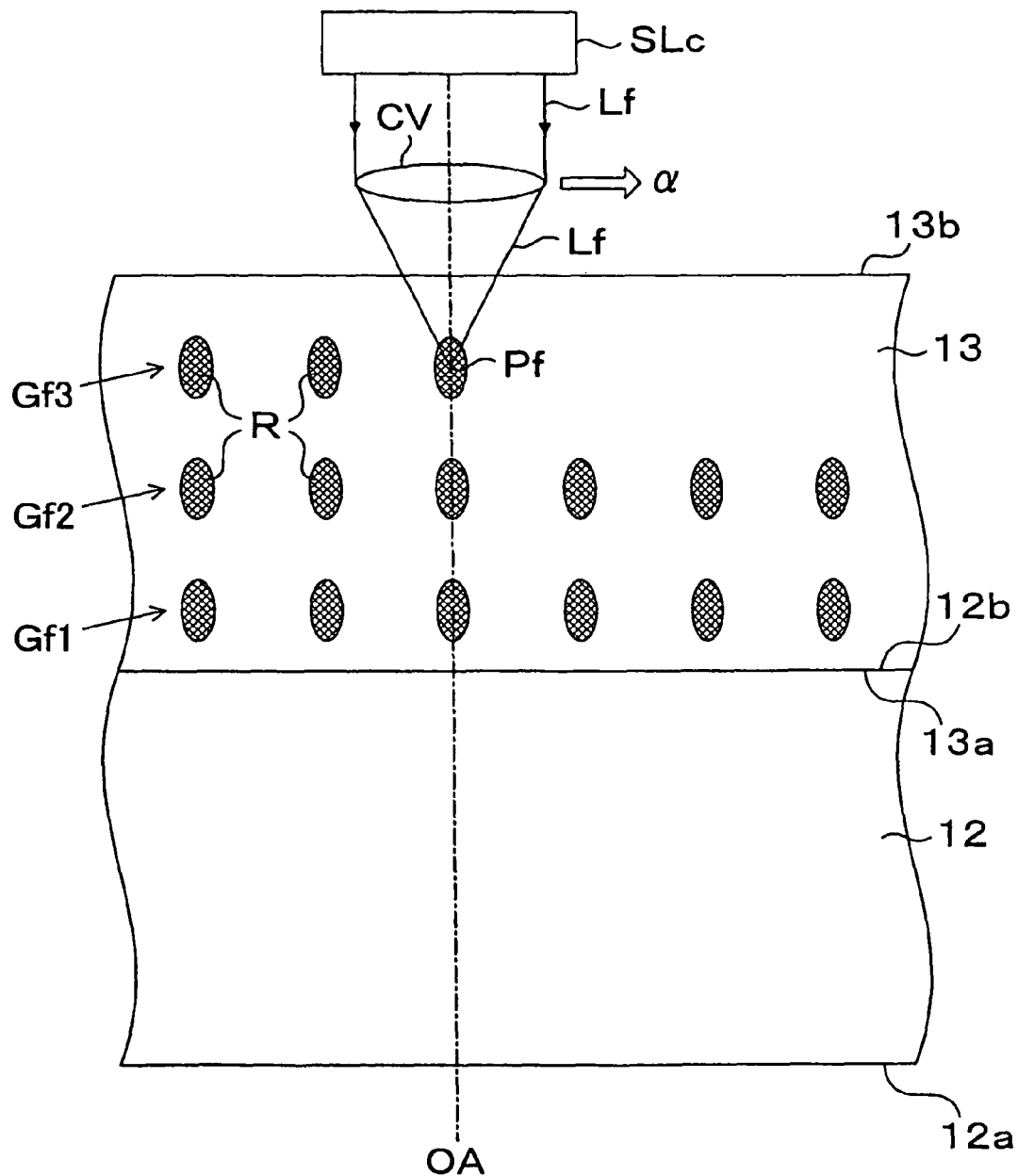
FIGS. 9 and 10 schematically show longitudinal sectional views of a two-layer wafer according to a fourth embodiment.
Figure 10:
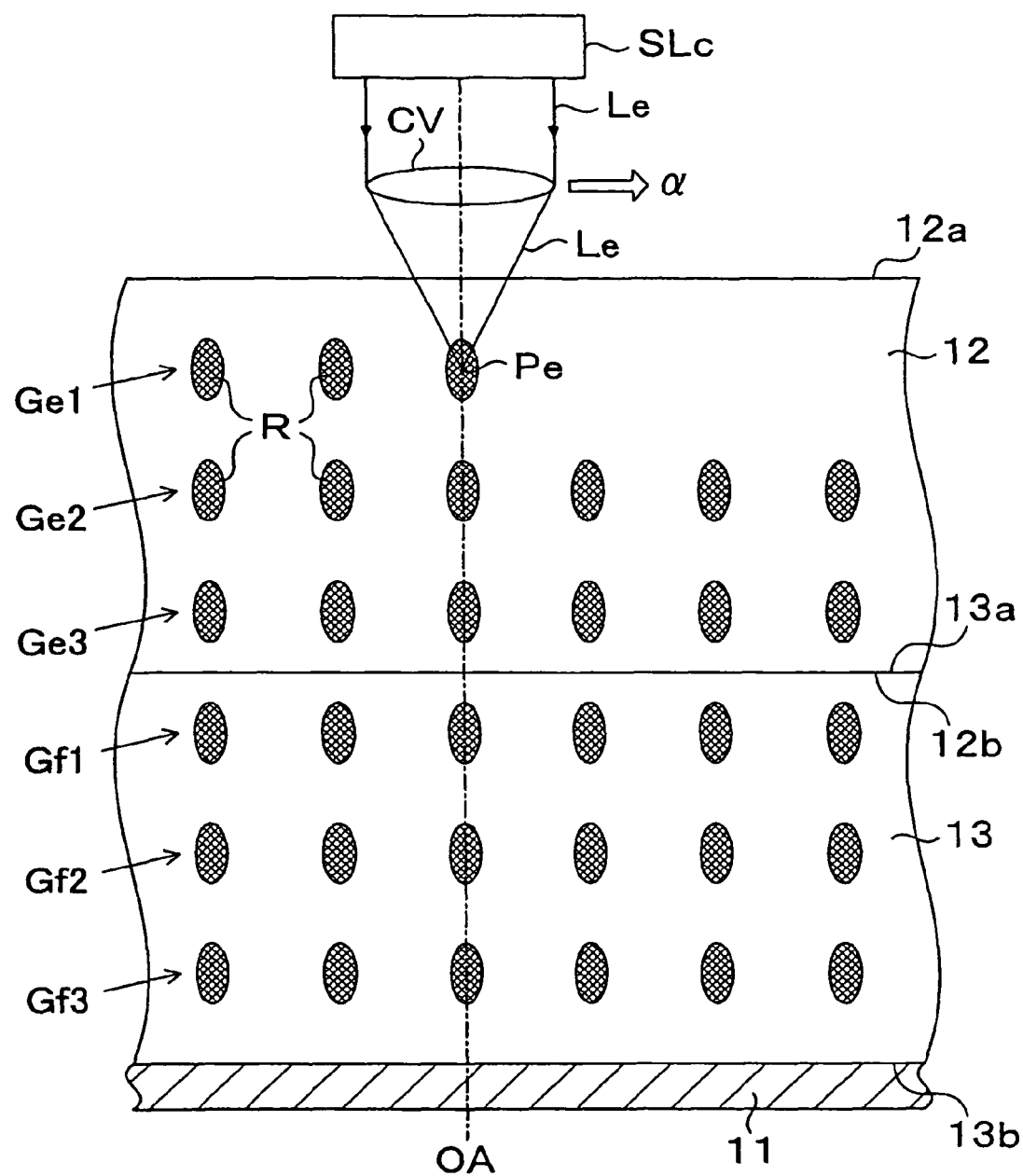

FIGS. 9 and 10 illustrate processes to radiate a laser beam to the wafers 12 and 13 and form a modifying region according to a fourth embodiment. FIGS. 9 and 10 schematically show longitudinal sectional views of the wafers 12 and 13 according to the fourth embodiment.

<Process 1: See FIG. 9>

Similarly to process 2 (FIG. 8) of the third embodiment, laser light source SLc generates laser beam Lf with wavelength λf. Laser light source SLc radiates laser beam Lf to the surface 13b of the wafer 13 to successively form 3-layer modifying region groups Gf1 through Gf3 in the wafer 13.

<Process 2: See FIG. 10>

The dicing film 11 is bonded to the surface 13b of the wafer 13. The two-layer structure of the wafers 12 and 13 is then reversed. With the reverse side 12a of the wafer 12 upward, the wafers 12 and 13 are mounted on the mounting base of the laser processing apparatus.

The laser processing apparatus radiates laser beam Le with wavelength λe from laser light source SLc. Optical axis OA for laser beam Le is kept perpendicular to the reverse side 12a of the wafer 12. In this state, laser beam Le is radiated to the reverse side 12a (incidence plane for laser beam Le) of the wafer 12 via condenser lens CV. Laser beam Le is converged on focusing point Pe, i.e., a specified position in the wafer 12. Modifying region R is formed at focusing point Pe in the wafer 12 as a result of radiation of laser beam Le.

The laser processing apparatus settles a depth position for focusing point Pe in the wafer 12 near the surface 12b of the wafer 12. In this state, the laser processing apparatus radiates pulsed laser beam Le and moves focusing point Pe relatively to the wafer 12. The laser processing apparatus forms one-layer modifying region group Ge3 at a specified depth position from the reverse side 12a of the wafer 12 (i.e., at a specified position inside from the incidence plane for laser beam Le). Modifying region group Ge3 is composed of multiple modifying regions R generated at a specified interval horizontally with reference to the surface 12b and the reverse side 12a of the wafer 12.

The laser processing apparatus gradually changes the depth position for focusing point Pe in the wafer 12. The laser processing apparatus successively forms 3-layer modifying region groups Ge3 through Ge1 along estimated cut line K of the wafer 12. The groups are arranged in the depth direction from the reverse side 12a of the wafer 12 so as to be separated, adjoined, or overlapped with each other.

<Process 3>

The dicing film 11 is expanded horizontally with reference to estimated cut line K to apply a tensile stress to modifying region groups Gf1 through Gf3 and Ge1 through Ge3 in the wafer 10. According to the examples in FIGS. 9 and 10, the dicing film 11 is expanded vertically when viewed on the corresponding pages.

A shear stress occurs in the wafer 13. A crack occurs first in the depth direction of the wafer 13 at the bottom-layer modifying region group Gf3 as an origin nearest to the dicing film 11. Another crack then occurs in the depth direction of the wafer 13 at the modifying region group Gf2 above Gf3 as an origin. Still another crack occurs in the depth direction of the wafer 13 at the modifying region group Gf1 above Gf2 as an origin. These cracks at modifying region groups Gf3 through Gf1 as origins develop to link together. The developed crack reaches the surface 13b and the reverse side 13a of the wafer 13 to cut and separate the wafer 13.

A shear stress occurs in the wafer 12. A crack occurs first in the depth direction of the wafer 12 at the bottom-layer modifying region group Ge3 as an origin nearest to the dicing film 11. Another crack then occurs in the depth direction of the wafer 12 at the modifying region group Ge2 above Ge3 as an origin. Still another crack occurs in the depth direction of the wafer 12 at the modifying region group Ge1 above Ge2 as an origin. These cracks at modifying region groups Ge3 through Ge1 as origins develop to link together. The developed crack reaches the surface 12b and the reverse side 12a of the wafer 12 to cut and separate the wafer 12.

<Operations and Working Effects of the Fourth Embodiment>

The fourth embodiment can provide the same operations and working effects as those described in <3-2> through <3-4> of the third embodiment.

Similarly to the third embodiment, the fourth embodiment uses one laser light source SLc that selects one of laser beams Le and Lf with two wavelengths λe and λf and radiates the selected laser beam. In process 1 (FIG. 9), the embodiment radiates laser beam Lf with wavelength λf from the surface 13b of the upper wafer 13 to focusing point Pf in the lower wafer 13 of the two-layer structure. In this manner, the embodiment forms modifying regions R constituting 3-layer modifying region groups Gf1 through Gf3.

The fourth embodiment differs from the third embodiment as follows. In process 2 (FIG. 10), the embodiment radiates laser beam Le with wavelength λe from the reverse side 12a of the wafer 12 to focusing point Pe therein. In this manner, the embodiment forms modifying regions R constituting 3-layer modifying region groups Ge1 through Ge3.

According to the fourth embodiment, process 1 (FIG. 9) forms modifying region groups Gf1 through Gf3 in the wafer 13. The two-layer structure of the wafers 12 and 13 is then reversed. Process 2 (FIG. 10) forms modifying region groups Ge3 through Ge1 in the wafer 12. Accordingly, laser beam Le does not reflect on the boundary surface between the wafers 12 and 13.

When wavelength λe of laser beam Le is assigned a value appropriate for a material of the wafer 12, it is possible to normally and reliably form modifying regions R constituting modifying region groups Ge3 through Ge1 in the wafer 12. When wavelength λf of laser beam Lf is assigned a value appropriate for a material of the wafer 13, it is possible to normally and reliably form modifying regions R constituting modifying region groups Gf1 through Gf3 in the wafer 13. It may be preferable to experimentally find optimal values for wavelengths λe and λf with a cut-and-dry approach in consideration for materials and thicknesses of the wafers 12 and 13.

In the fourth embodiment, the order of processes 1 and 2 may be reversed as follows. Similarly to process 2 (FIG. 10), the embodiment radiates laser beam Le from the reverse side 12a of the wafer 12 to focusing point Pe therein. In this manner, the embodiment forms modifying region groups Ge3 through Ge1. The dicing film 11 is bonded to the reverse side 12a of the wafer 12. A set of the wafers 12 and 13 is then reversed. Similarly to process 1 (FIG. 9), the embodiment radiates laser beam Lf from the surface 13b of the wafer 13 to focusing point Pf therein. In this manner, the embodiment forms modifying region groups Gf1 through Gf3. Similarly to process 3, the dicing film 11 is expanded to cut and separate the wafers 12 and 13.

5. Fifth Embodiment

Figure 11:
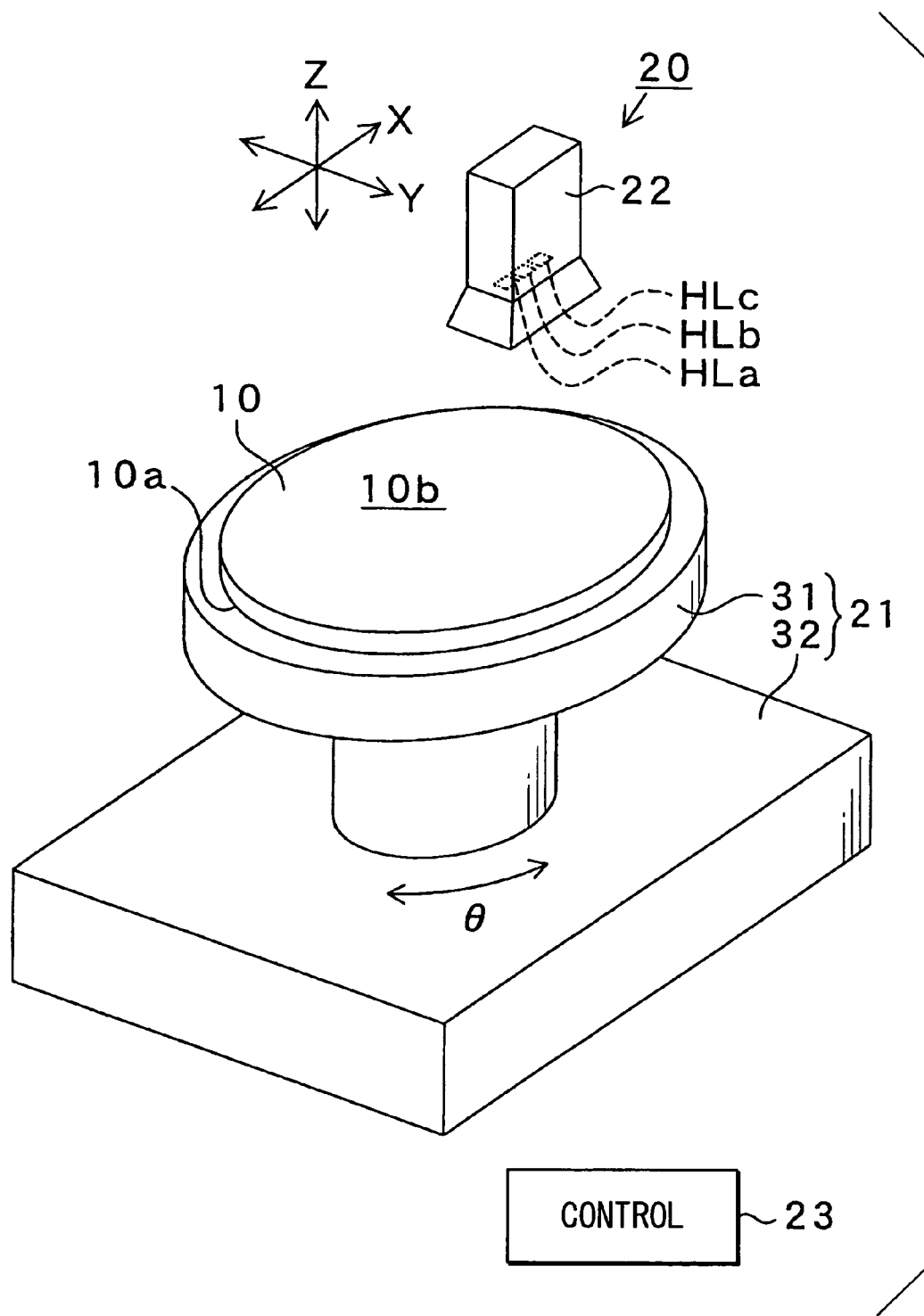
FIG. 11 is a perspective view showing the outlined construction of a laser processing apparatus.

FIG. 11 is a perspective view showing the outlined construction of a laser processing apparatus 20 for radiating a laser beam to a wafer 14 according to a fifth embodiment. The laser processing apparatus 20 includes a wafer mounting apparatus 21, a laser radiation apparatus 22, and a control apparatus 23.

The wafer mounting apparatus 21 includes a rotary table (stage or specimen support) 31 and a trolley table 32. The wafer 10 is mounted on the disk-shaped rotary table 31. The reverse side 10a of the wafer 10 is absorbed and fixed to an upper surface of the rotary table 31. The rotary table 31 is axially supported on the trolley table 32. The trolley table 32 contains a drive apparatus (not shown). This drive apparatus rotates the rotary table 31 in direction θ within a horizontal plane parallel to the surface 10b and the reverse side 10a of the wafer 10. A body base (not shown) of the laser processing apparatus 20 contains a drive apparatus (not shown). This drive apparatus moves the trolley table 32 in X and Y directions within a horizontal plane parallel to the surface 10b and the reverse side 10a of the wafer 10.

The laser radiation apparatus 22 is disposed above the rotary table 31. The laser processing apparatus 20 is provided with a drive apparatus (not shown). This drive apparatus moves the laser radiation apparatus 22 in X and Y directions within a horizontal plane parallel to the surface 10b and the reverse side 10a of the wafer 10. In addition, the laser radiation apparatus 22 moves in a Z direction perpendicular to the surface 10b and the reverse side 10a of the wafer 10. The laser radiation apparatus 22 contains three laser heads HLa through HLc. These laser heads are arranged in the X direction.

The control apparatus 23 controls the drive apparatus to control movement of the tables 31 and 32, and the laser radiation apparatus 22 in the X, Y, and Z directions. The X, Y, and Z directions are orthogonal to each other.

Figure 12A:
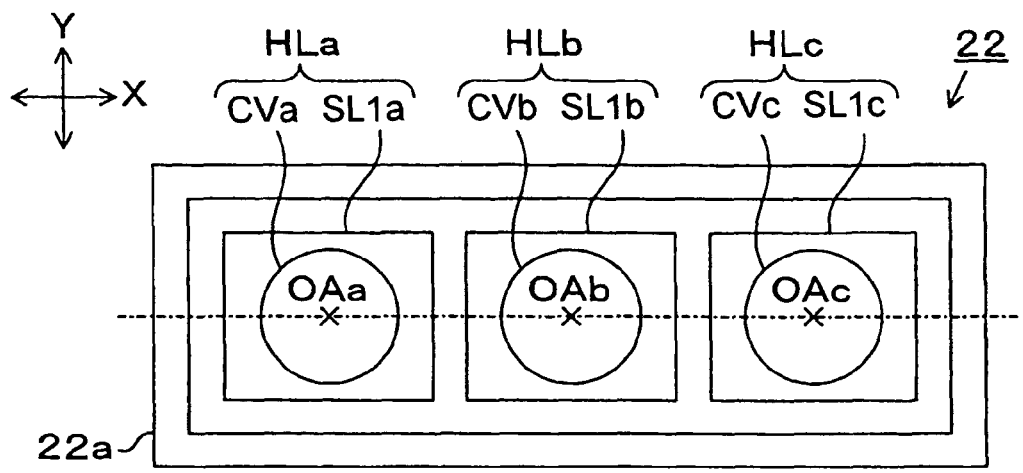
FIG. 12A is a bottom view of a laser radiation apparatus according to a fifth embodiment and FIG. 12B is a fragmentary longitudinal sectional view for explaining the outlined construction of the laser radiation apparatus according to the fifth embodiment.
Figure 12B:
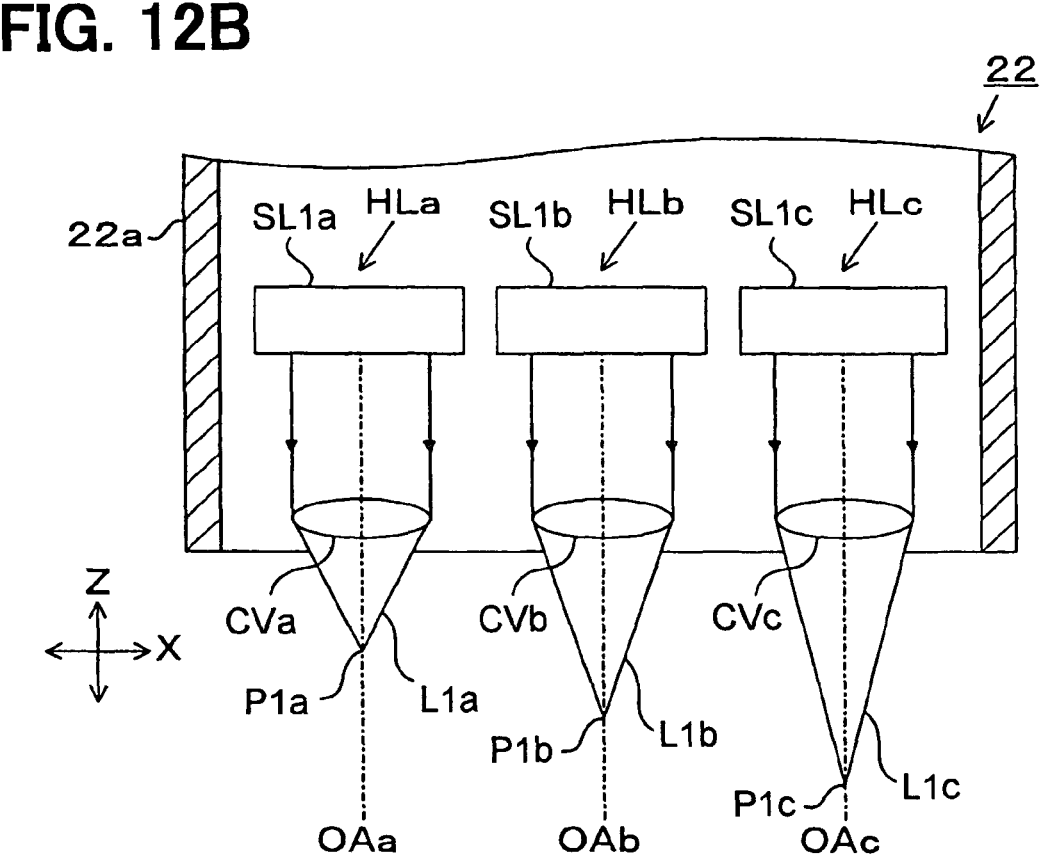

FIG. 12A is a bottom view of the laser radiation apparatus 22 according to the fifth embodiment. FIG. 12B is a fragmentary longitudinal sectional view for explaining the outlined construction of the laser radiation apparatus 22 according to the fifth embodiment. The laser radiation apparatus 22 is provided with a box-shaped housing 22a whose bottom is opened. The three laser heads HLa through HLc are fixed inside the housing 22a. Laser head HLa has laser light source SL1a and condenser lens CVa. Laser light source SL1a radiates laser beam L1a with wavelength λa. Laser beam L1a converges on focusing point P1a. The position of focusing point P1a is determined by wavelength λa and numeric aperture NAa of condenser lens CVa. Laser head HLb has laser light source SL1b and condenser lens CVb. Laser light source SL1b radiates laser beam L1b with wavelength λb. Laser beam L1b converges on focusing point P1b. The position of focusing point P1b is determined by wavelength λb and numeric aperture NAb of condenser lens CVb. Laser head HLc has laser light source SL1c and condenser lens CVc. Laser light source SL1c radiates laser beam L1c with wavelength λc. Laser beam L1c converges on focusing point P1c. The position of focusing point P1c is determined by wavelength λc and numeric aperture NAc of condenser lens CVc.

Optical axes OAa through OAc of laser beams L1a through L1c are directed to the Z direction and are arranged in the X direction. The control apparatus 23 controls radiation of laser beams L1a through L1c from laser heads HLa through HLc.

Figure 13A:
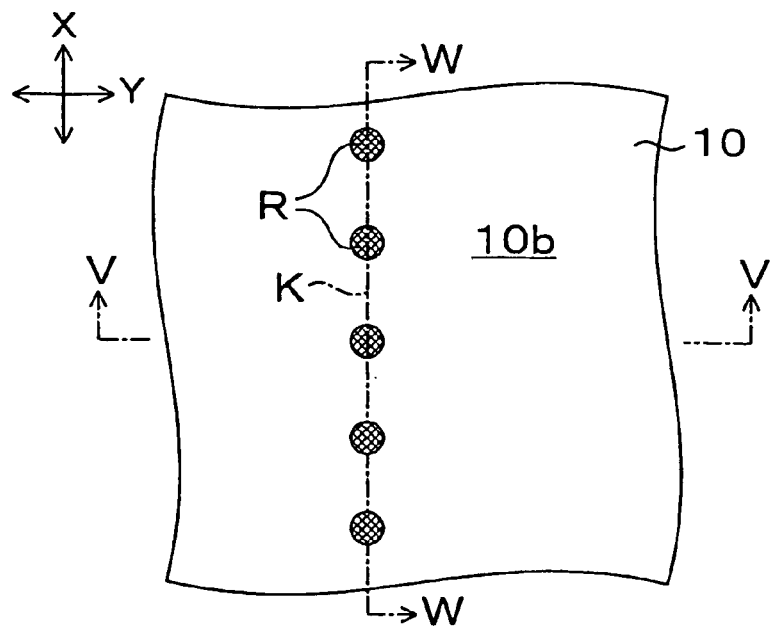
FIG. 13A is a plan view of a wafer according to the fifth embodiment and FIG. 13B is a sectional view taken in the line V-V of FIG. 13A.
Figure 13B:
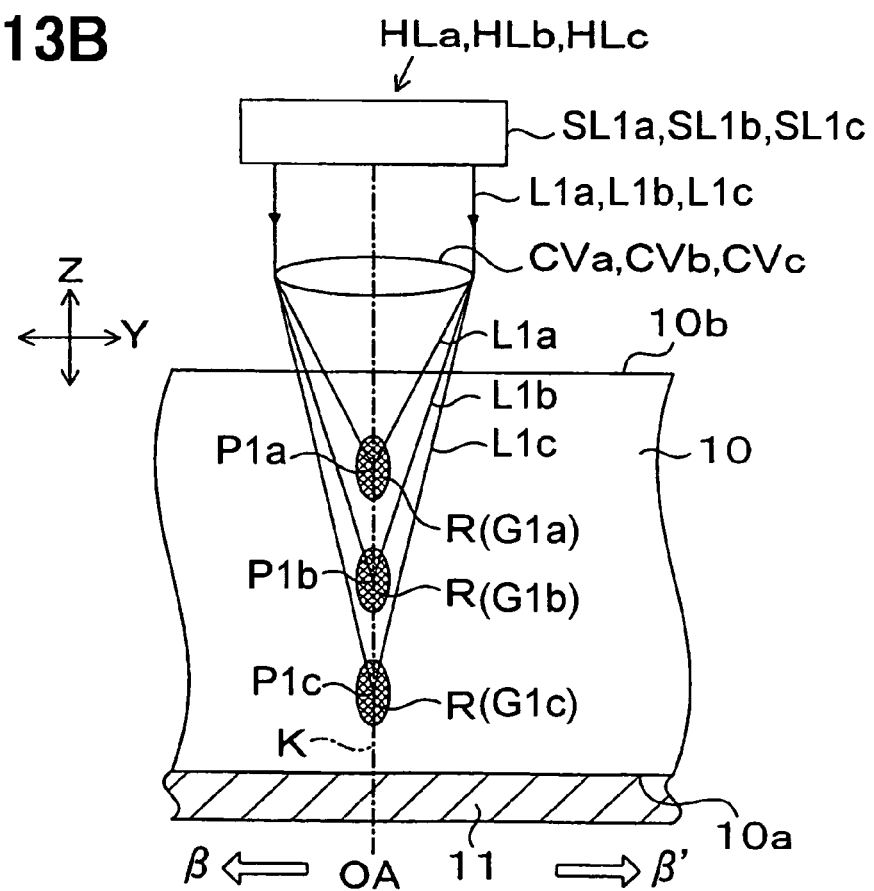
Figure 14:
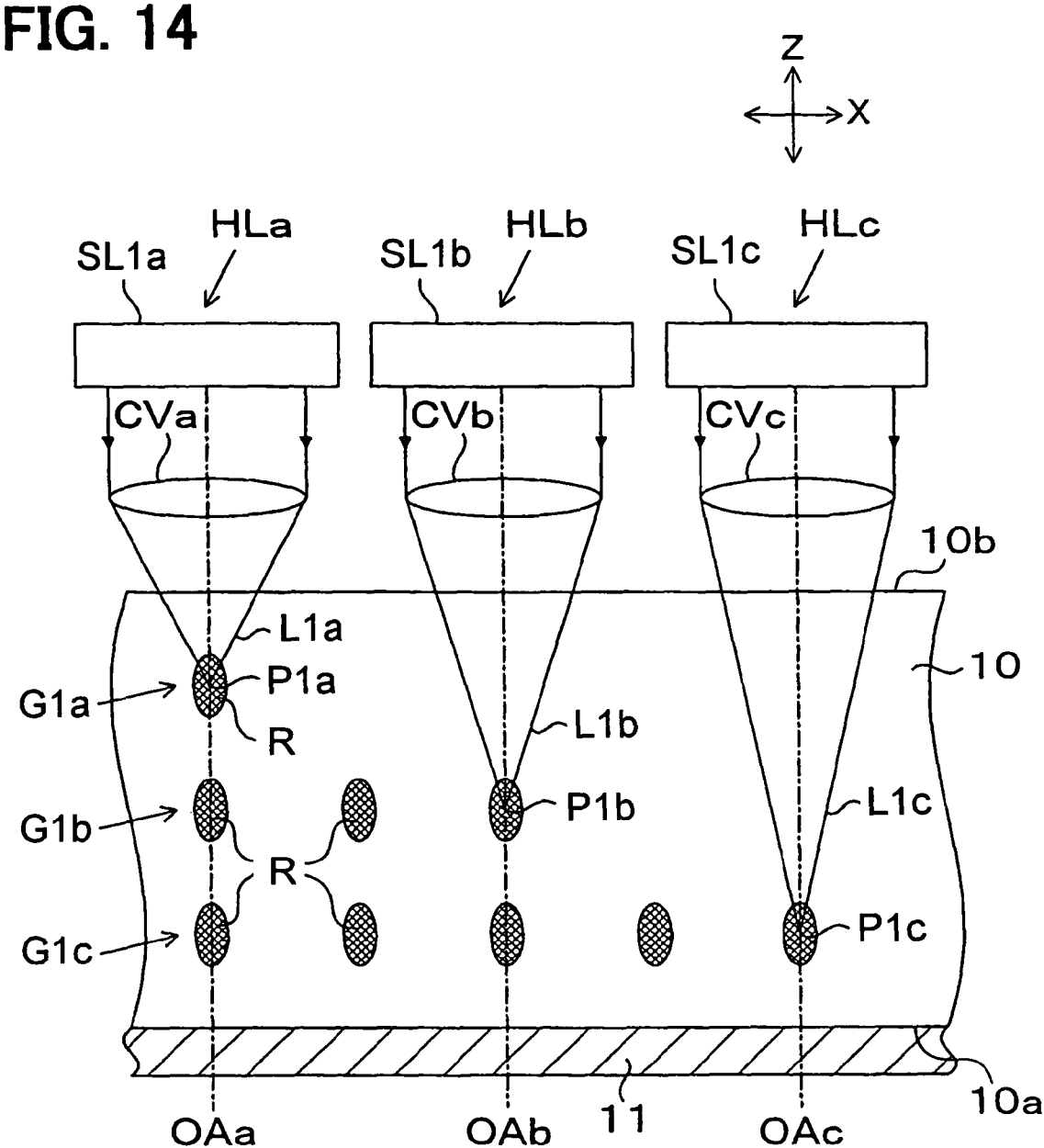
FIG. 14 is a sectional view taken in the line W-W of FIG. 13A equivalent to estimated cut line K.

FIGS. 13A, 13B, and 14 illustrate processes to radiate laser beams L1a through L1c to the wafer 10 and form modifying region R according to the fifth embodiment. FIG. 13A shows a plan view of the wafer 10. FIGS. 13B and 14 schematically show longitudinal sectional views of the wafer 10. FIG. 13B is a sectional view taken in the line V-V of FIG. 13A. FIG. 14 is a sectional view taken in the line W-W of FIG. 13A equivalent to estimated cut line K.

A wafer (bulk silicon wafer) 10 is made of a bulk monocrystalline silicon material. A reverse side 10a of the wafer 10 is attached with a dicing film (dicing sheet, dicing tape, and expand tape) 11. The dicing film 11 is made of an expansible plastic film material that expands by heating or applying a force in an expanding direction. The dicing film 11 is bonded to all over the reverse side of the wafer 10 with an adhesive (not shown).

The wafer 10 is placed with its surface 10b upward and its reverse side 10a downward. The dicing film 11 is bonded to the reverse side 10a. In this state, the wafer 10 is mounted on the rotary table 31 (see FIG. 11). The dicing film 11 makes contact with the upper surface of the rotary table 31.

The laser processing apparatus 20 controls optical axes OAa through OAc of laser beams L1a through L1c so as to be perpendicular to the surface 10b of the wafer 10 and aligned to estimated cut line K. The laser processing apparatus 20 radiates laser beams L1a through L1c to the surface 10b (incidence plane for laser beams L1a through L1c) of the wafer 10 via condenser lenses CVa through CVc. The laser processing apparatus 20 condenses laser beam L1a through L1c to specified positions in the wafer 10 as different focusing points (focuses) P1a through P1c. As a result, the laser processing apparatus 20 radiates laser beams L1a through L1c to different focusing points P1a through P1c in the wafer 10 to form modifying regions (modifying layers) R.

Increasing the laser beam wavelength deepens a depth position of the focusing point in the wafer. Modifying region R is formed at a deep portion from the surface 10b of the wafer 10. In other words, increasing the laser beam wavelength also increases a distance from the laser beam's incident surface (surface 10b of the wafer 10) to the focusing point. Modifying region R is formed at a portion distant from the laser beam's incidence plane in the wafer 10.

Decreasing the numeric aperture of the condenser lens deepens the depth position for the focusing point in the wafer 10. Modifying region R is formed deep from the surface 10b of the wafer 10. In other words, decreasing the numeric aperture of the condenser lens increases a distance between the laser beam's incidence plane (surface 10b of the wafer 10) and the focusing point. Modifying region R is formed in the wafer 10 far from the laser beam's incidence plane. Depth positions of focusing points P1a through P1c in the wafer 10 are equivalent to distances from the surface 10b (incidence plane for the laser beams L1a through L1c) of the wafer 10 to the focusing points P1a through P1c.

When laser beams L1a through L1c are assigned wavelengths λa through λc in an increasing order (λa<λb<λc), depth positions for focusing points P1a through P1c can be stepwise deepened in this order. When condenser lenses CVa through CVc are assigned numeric apertures NAa through NAc in a decreasing order (NAa>NAb>NAc), depth positions for focusing points P1a through P1c can be deepened in this order. Even when wavelengths λa through λc and numeric apertures NAa through NAc are specified as mentioned above, depth positions for focusing points P1a through P1c can be deepened in this order.

Modifying region R includes a melt treatment region mainly due to the multiphoton absorption generated by radiation of laser beams L1a through L1c. That is, the multiphoton absorption due to laser beams L1a through L1c locally heats locations corresponding to focusing points P1a through P1c in the wafer 10. The heated location is once melt and then rehardens. In this manner, a region that is melt and then rehardens in the wafer 10 becomes modifying region R. The melt treatment region signifies a region where a phase or a crystal structure changes. In other words, the melt treatment region is one of the regions where, in the wafer 10, monocrystalline silicon changes to amorphous silicon; monocrystalline silicon changes to polycrystal silicon; and monocrystalline silicon changes to a structure containing amorphous silicon and polycrystal silicon. Since the wafer 10 is a bulk silicon wafer, the melt treatment region is chiefly made of polycrystal silicon. Since the wafer 10 is a bulk silicon wafer, the melt treatment region is chiefly made of polycrystal silicon.

The melt treatment region is formed mainly by the multiphoton absorption, not by absorption of laser beams L1a through L1c in the wafer 10 (i.e., normal heating by a laser beam). Accordingly, laser beams L1a through L1c are scarcely absorbed in locations other than focusing points P1a and P1b in the wafer 10. This prevents the surface 10b of the wafer 10 from being melted or deformed.

The laser processing apparatus 20 keeps the constant depth positions for focusing points P1a through P1c in the wafer 10. In this state, the laser processing apparatus 20 moves the laser radiation apparatus 22 in the X direction and radiates pulsed laser beams L1a through L1c for scanning. In this manner, the laser processing apparatus 20 moves focusing points P1a through P1c in the X direction along straight estimated cut line K for the wafer 10.

In the above description, the laser radiation apparatus 22 is moved to scan laser beams L1a through L1c. Instead, the laser radiation apparatus 22 may be fixed. The tables 31 and 32 may be rotated or moved in a direction orthogonal to the radiation direction of laser beams L1a through L1c. The direction is equivalent to the incident direction of laser beams L1a through L1c with reference to the surface 10b of the wafer 10. That is, the laser radiation apparatus 22 is moved to scan laser beams L1a through, L1c. The tables 31 and 32 are rotated and moved to move the wafer 10. In this manner, focusing points P1a through P1c only need to be moved relatively to the wafer 10 along estimated cut line K of the wafer 10.

The laser processing apparatus 20 keeps the constant depth positions for focusing points P1a through P1c in the wafer 10. In this state, the laser processing apparatus 20 radiates pulsed laser beams L1a through L1c and moves focusing points P1a through P1c relatively to the wafer 10. The laser processing apparatus 20 simultaneously forms a set of 3-layer modifying region groups G1a through G1c at a specified depth position from the surface 10b of the wafer 10. The depth position corresponds to a specified distance inside from the incidence plane for laser beams L1a through L1c. Each modifying region group includes multiple modifying regions R horizontally (X direction) located at a specified interval with reference to the surface 10b and the reverse side 10a of the wafer 10.

It is necessary to form 3-layer modifying region groups G1c through G1a in the order of G1c, G1b, and G1a. That is, the formation needs to start from the modifying region group farthest from the surface 10b (incidence plane for laser beams L1a through L1c) of the wafer 10 where laser beams L1a through L1c are incident. For example, let us suppose to first form modifying region groups G1a and thereafter G1c. Modifying region group G1a is located near to the surface 10b of the wafer 10 where laser beam L is incident. Modifying region group G1c is located far from the surface 10b thereof. The first formed modifying region group G1a scatters laser beam L radiated during formation of modifying region group G1c. This causes irregular sizes of modifying regions R constituting modifying region group G1c. Modifying region group G1c cannot be formed uniformly.

By contrast, the fifth embodiment forms modifying region groups G1c through G1a in order starting from the farthest from the surface 10b (incidence plane for laser beam L) of the wafer 10 where laser beam L is incident. It is possible to form new modifying region R with no modifying region R between the incidence plane of the surface 10b and focusing point P. The already formed modifying region R does not scatter laser beam L. It is possible to uniformly form 3-layer modifying region groups G1a through G1c.

FIG. 14 shows an example of relatively moving focusing points P1a through P1c along estimated cut line K. There may be a case where focusing points P1c through P1a move in the order of P1c, P1b, and P1a. That is, focusing point P1c comes first. Focusing point P1b then follows. Focusing point P1c comes last. Focusing points P1c through P1a need to be set so that the corresponding depth positions become shallow in the order of P1c, P1b, and P1a. That is, the depth position for focusing point P1c needs to be deepest. The depth position for focusing point P1a needs to be shallowest. The depth position for focusing point P1b needs to be intermediate between focusing points P1a and P1c.

In this manner, the top layer can contain modifying region group G1a formed by focusing point P1a. The intermediate layer can contain modifying region group G1b formed by focusing point P1b. The bottom layer can contain modifying region group G1c formed by focusing point P1c. It is possible to form modifying regions R constituting modifying region groups G1c through G1a in the order of G1c, G1b, and G1a starting from the farthest from the surface 10b (incidence plane for laser beam L) of the wafer 10 where laser beams L1a through L1c are incident.

As mentioned above, modifying region groups G1a through G1c are formed in the wafer 10. The dicing film 11 is then expanded horizontally (direction indicated by arrows β and β' in FIGS. 13A and 13B, i.e., Y direction) against the estimated cut line. A tensile stress is applied to modifying region groups G1a through G1c.

As a result, a shear stress occurs in the wafer 10. A crack occurs first in the depth direction of the wafer 10 at the bottom-layer modifying region group G1c as an origin nearest to the dicing film 11. Another crack then occurs in the depth direction of the wafer 10 at the middle-layer modifying region group G1b as an origin. Still another crack then occurs in the depth direction of the wafer 10 at the top-layer modifying region group G1a as an origin. These cracks at modifying region groups G1a through G1c as origins develop to link together. The developed crack reaches the surface 10b and the reverse side 10a of the wafer 10 to cut and separate the wafer 10.

Modifying region groups G1a through G1c are formed along estimated cut line K. It is a good practice to expand the dicing film 11 and appropriately apply a tensile stress to modifying region groups G1a through G1c. This causes a tear at each modifying region R constituting modifying region groups G1a through G1c. Modifying region R works as an origin for cutting. In this manner it is possible to accurately cut and separate the wafer 10 with a relatively small force without causing an unnecessary crack in the wafer 10.

Many chips (not shown) are laid out in a grid pattern on the surface 10b of the thin and approximately circular disk-shaped wafer 10. The estimated cut line K is provided between chips. That is, multiple estimated cut lines K are laid out in a grid pattern on the surface 10b of the wafer 10. After modifying region groups G1a through G1c are formed for each estimated cut line K, expanding the dicing film 11 can cut and separate the wafer 10 into chips.

<Operations and Working Effects of the Fifth Embodiment>

The fifth embodiment uses three laser heads HLa through HLc to radiate laser beams L1a through L1c. The embodiment adjusts at least one of wavelengths λa through λc for laser beams L1a through L1c or at least one of numeric apertures NAa through NAc for condenser lenses CVa through CVc. The embodiment appropriately sets depth positions for focusing points P1a through P1c of laser beams L1a through L1c in the wafer 10. The embodiment simultaneously forms modifying regions R constituting a set of 3-layer modifying region groups G1a through G1c. The modifying region groups are separated, adjoined, or overlapped with each other along estimated cut line K of the wafer 10 in the depth direction from the surface 10b thereof.

In other words, the fifth embodiment radiates laser beams L1a through L1c to the wafer 10. The embodiment assigns different positions (depth positions) to focusing points P1a through P1c for laser beams L1a through L1c in the incident direction (depth direction of the wafer 10) on the wafer 10. The embodiment forms modifying regions R constituting 3-layer modifying region groups G1a through G1c so as to be separated, adjoined, or overlapped with each other along the incident direction.

The fifth embodiment simultaneously radiates laser beams L1a through L1c to the wafer 10. In this manner, the embodiment forms modifying regions R constituting 3-layer modifying region groups G1a through G1c with different depths corresponding to laser beams L1a through L1c. The embodiment has the following advantage compared to the technology disclosed in patent document 1 that forms only one-layer modifying region in the depth direction from the wafer surface. Even when the wafer 10 is thick, the embodiment increases the number of modifying regions R as origins for cutting the wafer 10. It is possible to accurately cut and separate the wafer 10 along estimated cut line K.

The fifth embodiment simultaneously forms modifying region groups G1a through G1c to improve the processing efficiency. The embodiment can reliably form multiple layers of normal modifying region groups G1a through G1c in a short period of time. The embodiment provides high throughput and is suitable for mass production.

According to the fifth embodiment, laser beams L1a through L1c are vertically incident on the surface 10b of the wafer 10. It is possible to narrow estimated cut line K where laser beams L1a through L1c are radiated. More chips can be cut out from one wafer 10 than can be yielded by widening estimated cut line K. Chip manufacturing costs can be reduced.

Further, the fifth embodiment configures movement directions and depth positions for focusing points P1a through P1c with reference to the wafer 10. The purpose is to successively form modifying regions R constituting modifying region groups G1a through G1c starting from the farthest from the surface 10b (incidence plane for laser beam L) of the wafer 10. Modifying region R formed at a shallow portion from the surface 10b of the wafer 10 does not hinder incidence of a laser beam for forming modifying region R at a deep portion. Normal modifying region R can be reliably formed at the deep portion.

The fifth embodiment uses three laser heads HLa through HLc to form 3-layer modifying region groups G1a through G1c. In addition, two or four or more laser heads may be used to form two or four layers or more of modifying region groups.

6. Sixth Embodiment

Figure 15A:
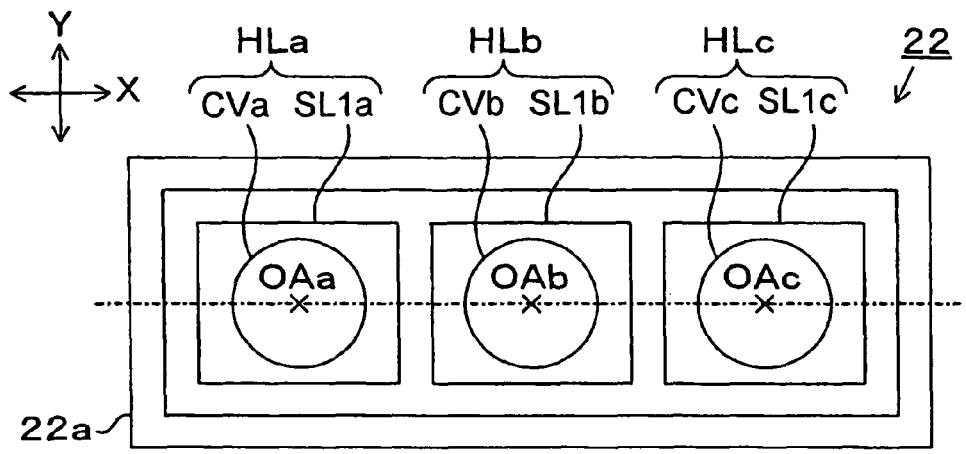
FIG. 15A is a bottom view of a laser radiation apparatus according to a sixth embodiment and FIG. 15B is a fragmentary longitudinal sectional view for explaining the outlined construction of the laser radiation apparatus according to the sixth embodiment.
Figure 15B:
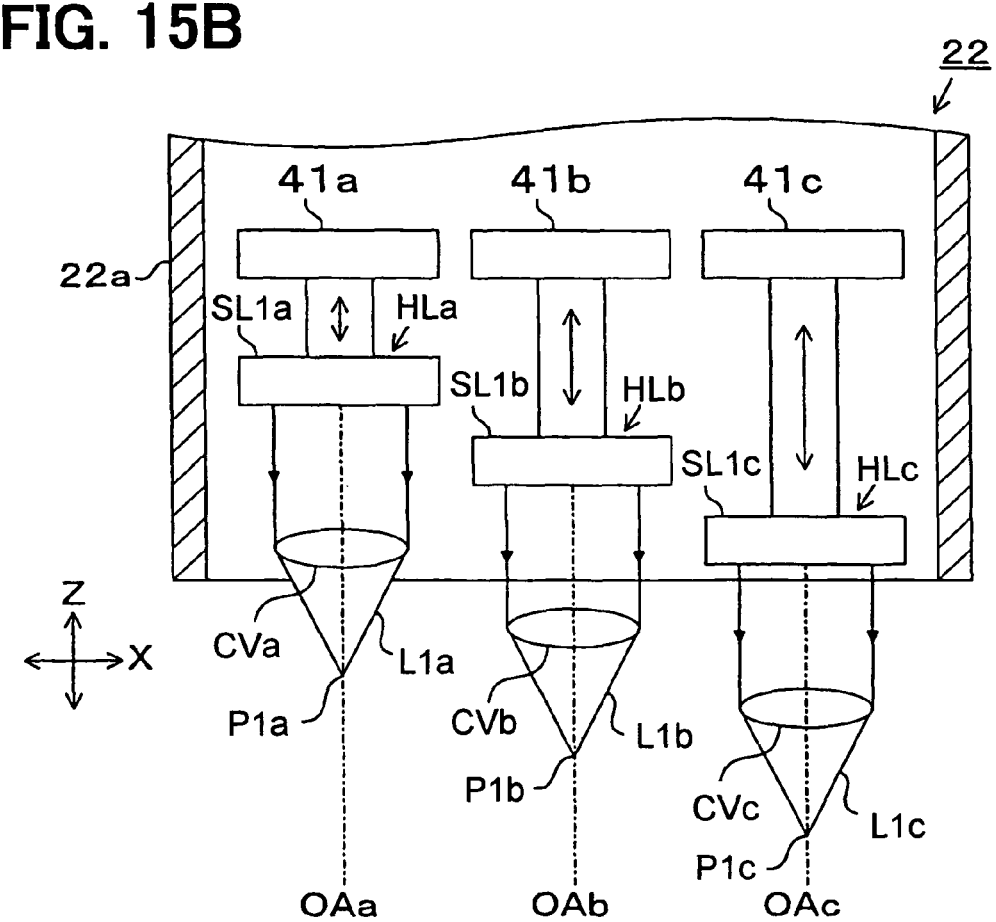

FIG. 15A is a bottom view of the laser radiation apparatus 22 according to a sixth embodiment. FIG. 15B is a fragmentary longitudinal sectional view for explaining the outlined construction of the laser radiation apparatus 22 according to the sixth embodiment.

Figure 16A:
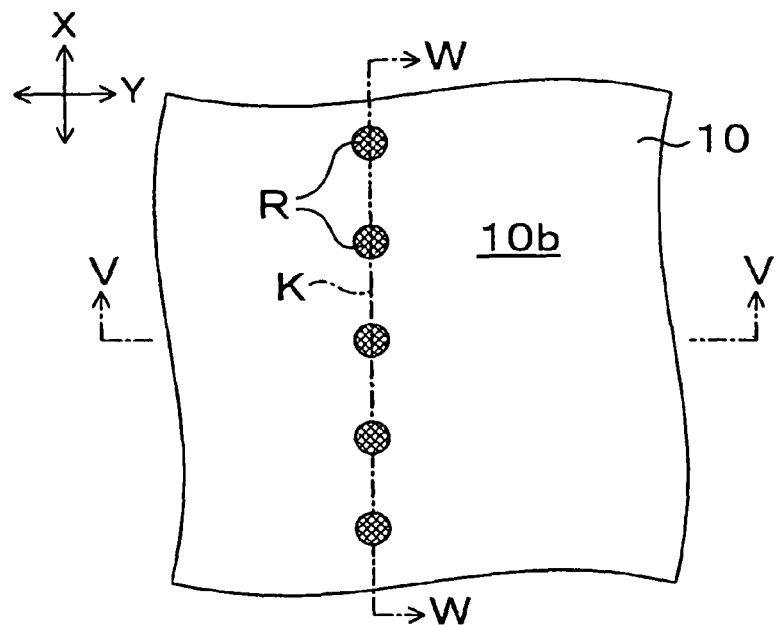
FIG. 16A is a plan view of a wafer according to the sixth embodiment and FIG. 16B is a sectional view taken in the line V-V of FIG. 16A.
Figure 16B:
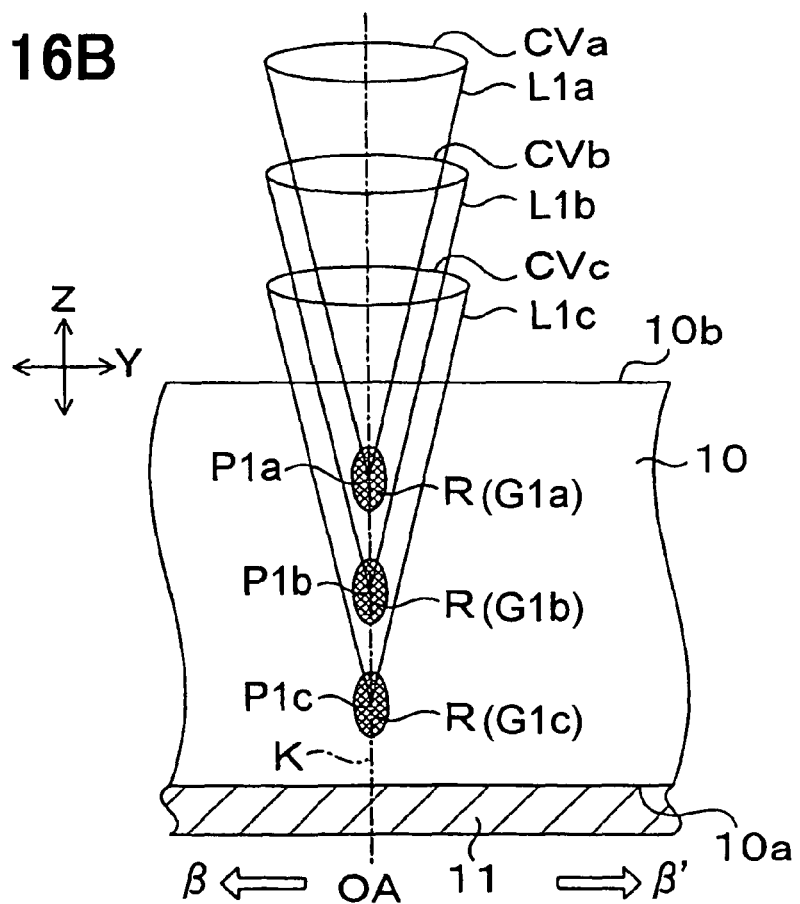
Figure 17:
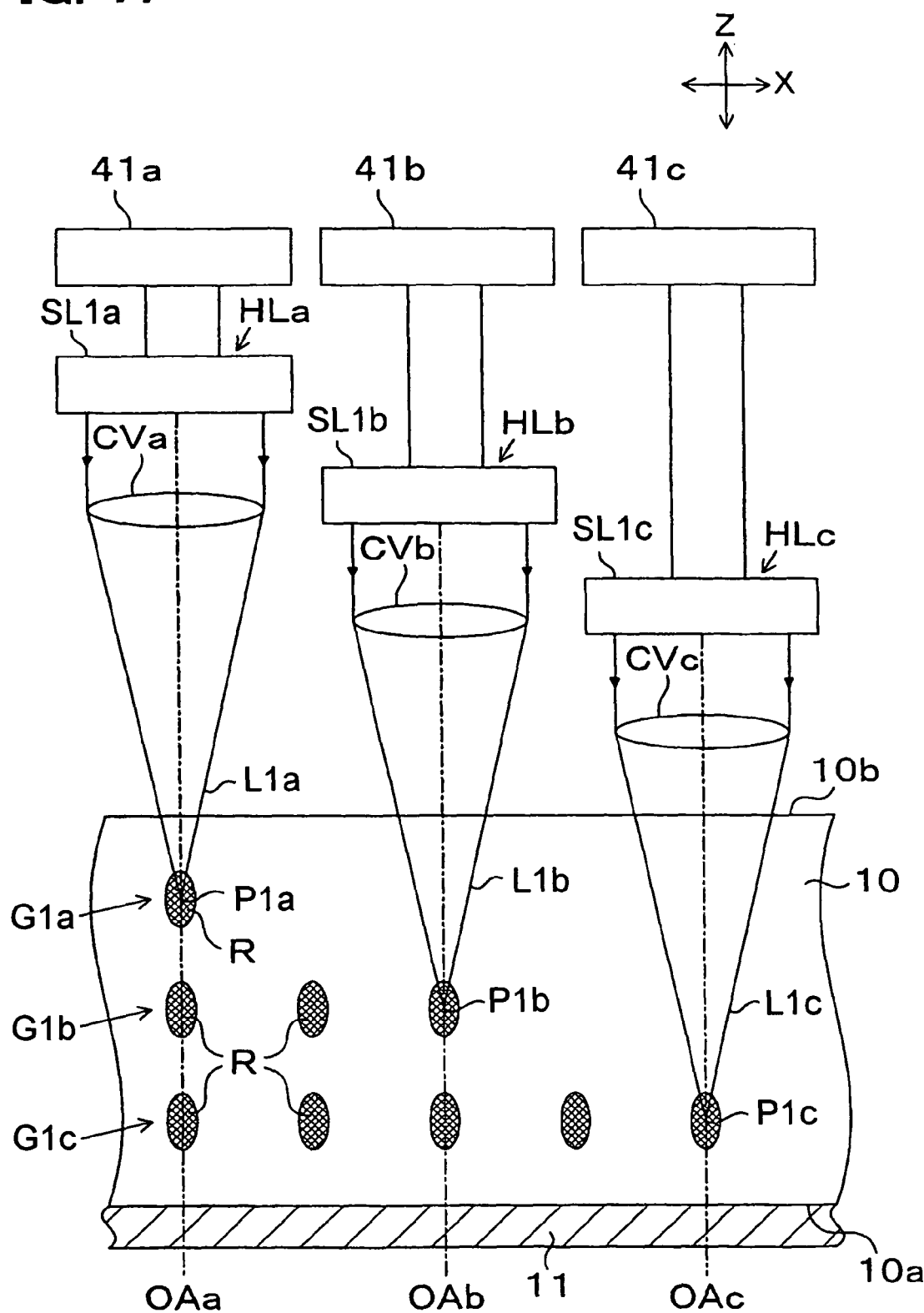
FIG. 17 is a sectional view taken in the line W-W of FIG. 16A equivalent to estimated cut line K.

FIGS. 16A, 16B, and 17 illustrate processes to radiate laser beams L1a through L1c to the wafer 10 and form modifying region R according to the sixth embodiment. FIG. 16A shows a plan view of the wafer 10. FIGS. 16B and 17 schematically show longitudinal sectional views of the wafer 10. FIG. 16B is a sectional view taken in the line V-V of FIG. 16A. FIG. 17 is a sectional view taken in the line W-W of FIG. 16A equivalent to estimated cut line K.

The sixth embodiment differs from the fifth embodiment as follows.

<6-1> The laser radiation apparatus 22 contains three drive apparatuses 41a through 41c.

<6-2> The drive apparatus 41a moves back and forth laser head HLa in the Z direction along optical axis OAa. The drive apparatus 41b moves back and forth laser head HLb in the Z direction along optical axis OAb. The drive apparatus 41c moves back and forth laser head HLc in the Z direction along optical axis OAc. The drive apparatuses 41a through 41c may be realized by any mechanism such as a rack and pinion or a ball screw.

<6-3> The control apparatus 23 controls the drive apparatuses 41a through 41c to control movement of laser heads HLa through HLc in the Z direction.

<6-4> Wavelengths for laser beams L1a through L1c are set to the same value. Numeric apertures for condenser lenses CVa through CVc are set to the same value.

The sixth embodiment uses the drive apparatuses 41a through 41c to adjust positions of laser heads HLa through HLc in the Z direction. Similarly to the fifth embodiment, the sixth embodiment properly sets depth positions for focusing points P1a through P1c of laser beams L1a through L1c in the wafer 10. The embodiment simultaneously forms a set of 3-layer modifying region groups G1a through G1c. The modifying region groups are separated, adjoined, or overlapped with each other along estimated cut line K of the wafer 10 in the depth direction from the surface 10b thereof. The sixth embodiment can provide the same operations and working effects as the fifth embodiment.

7. Seventh Embodiment

Figure 18A:
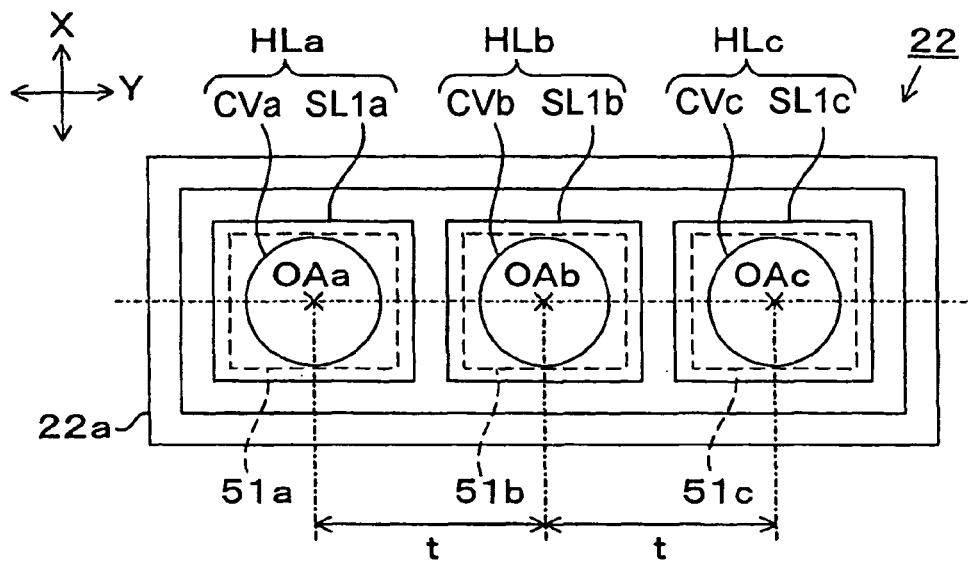
FIG. 18A is a bottom view of a laser radiation apparatus according to a seventh embodiment and FIG. 18B is a fragmentary perspective view of a wafer.
Figure 18B:
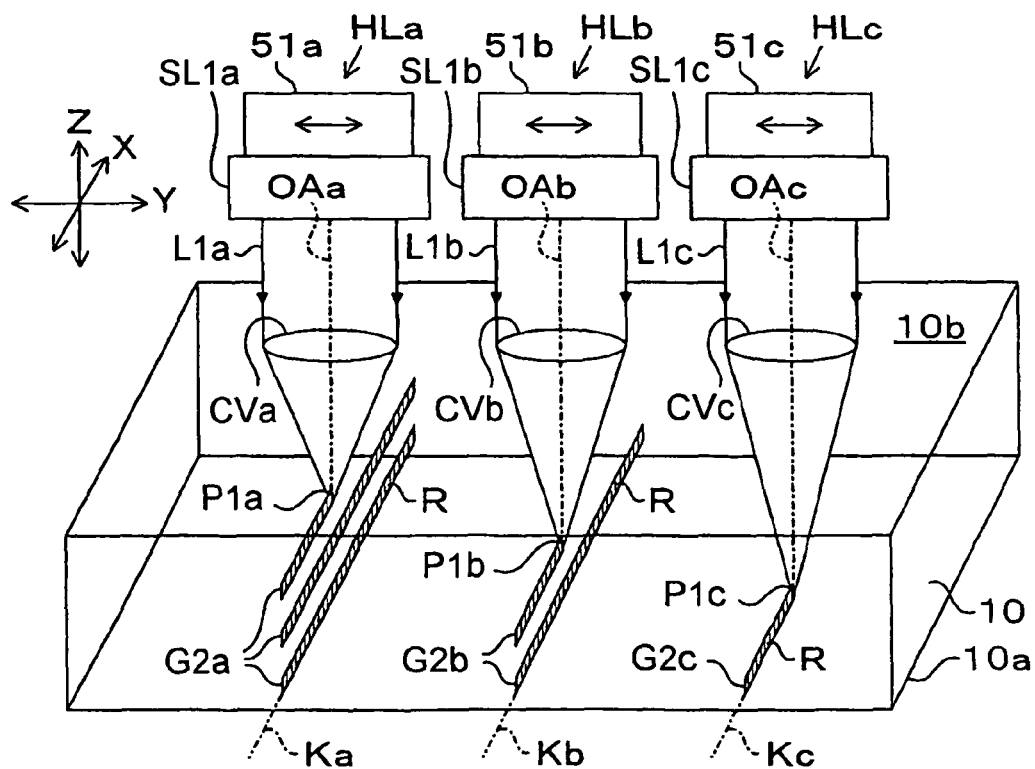

FIG. 18A is a bottom view of the laser radiation apparatus 22 according to a seventh embodiment. FIG. 18B is a fragmentary perspective view of the wafer 10 and illustrates processes to radiate laser beams L1a through L1c to the wafer 10 and form modifying region R according to the seventh embodiment.

The seventh embodiment differs from the fifth embodiment as follows.

<7-1> The laser radiation apparatus 22 contains laser heads HLa through HLc that radiate laser beams L1a through L1c. Optical axes OA of laser beams L1a through L1c are directed to the Z direction and are arranged along the Y direction.

<7-2> The laser radiation apparatus 22 contains three drive apparatuses 51a through 51c.

<7-3> The drive apparatuses 51a through 51c move back and forth laser heads HLa through HLc in the Y direction. The drive apparatuses 51a through 51c may be realized by any mechanism such as a rack and pinion or a ball screw.

<7-4> The control apparatus 23 controls drive apparatuses 51a through 51c to control movement of laser heads HLa through HLc in the Y direction. The control apparatus 23 aligns interval t between optical axes OAa through OAc to an interval between estimated cut lines Ka through Kc. As mentioned above, the estimated cut line is placed between chips to be cut and separated from the wafer 10. The interval between estimated cut lines Ka through Kc (interval t between optical axes OAa through OAc) is equivalent to the width or depth of one chip. Estimated cut lines Ka through Kc extend along the X direction and are arranged in the Y direction. Laser heads HLa through HLc move back and forth in the Y direction. The Y direction is equivalent to the horizontal direction orthogonal to estimated cut lines Ka through Kc.

The laser processing apparatus 20 keeps optical axis OAa through OAc of laser beams L1a through L1c perpendicular to the surface 10b of the wafer 10 and aligns optical axes OAa through OAc to estimated cut lines Ka through Kc, respectively. In this state, laser beams L1a through L1c are radiated to the surface 10b of the wafer 10 via condenser lenses CVa through CVc. Laser beam L is converged on focusing points P1a through P1c, i.e., specified positions in the wafer 10. Modifying region R is formed at focusing points P1a through P1c in the wafer 10 as a result of radiation of laser beams L1a through L1c.

The laser processing apparatus 20 keeps the constant depth positions for focusing points P1a through P1c in the wafer 10. In this state, the laser processing apparatus 20 radiates pulsed laser beams L1a through L1c and moves focusing points P1a through P1c in the X direction relatively to the wafer 10. The laser processing apparatus 20 simultaneously forms three modifying region groups G2a through G2c composed of multiple modifying regions R at a specified interval in the X direction along estimated cut lines Ka through Kc. Similarly to the fifth embodiment, the laser processing apparatus 20 adjusts at least one of wavelengths λa through λc for laser beams L1a through L1c or at least one of numeric apertures NAa through NAc for condenser lenses CVa through CVc. In this manner, the laser processing apparatus 20 sets depth positions for focusing points P1a through P1c.

<7-6> The laser processing apparatus 20 gradually changes depth positions for focusing points P1a through P1c in the wafer 10. The laser processing apparatus 20 successively forms modifying regions R constituting multiple layers of modifying region groups. The modifying region groups are separated, adjoined, or overlapped with each other along estimated cut lines Ka through Kc in the depth direction from the surface 10b thereof. The depth direction is equivalent to the thickness direction of the wafer 10, the section direction thereof, and the direction orthogonal to the surface 10b and the reverse side 10a thereof.

In the example of FIG. 18B, three-layer modifying region group G2a is being formed along estimated cut line Ka. Two-layer modifying region group G2b is being formed along estimated cut line Kb. One-layer modifying region group G2c is being formed along estimated cut line Kc. After each layer, which is being formed, is completed, the laser heads HLa through HLc is moved forth in the Y direction (rightward in FIG. 8B) by interval t, relatively to the wafer 10.

Similarly to the fifth embodiment, the seventh embodiment configures movement directions and depth positions for focusing points P1a through P1c with reference to the wafer 10. The purpose is to always start formation of modifying regions R from the farthest (i.e., the deepest position) from the surface 10b of the wafer 10 as the incidence plane for laser beam L.

The seventh embodiment uses the drive apparatuses 51a through 51c to adjust Y-direction positions of laser heads HLa through HLc. The embodiment aligns interval t between optical axes OAa through OAc to the interval between estimated cut lines Ka through Kc. The embodiment configures depth positions for focusing points P1a through P1c of laser beams L1a through L1c similarly to the fifth embodiment. The seventh embodiment moves focusing points P1a through P1c in the X direction along estimated cut lines Ka through Kc.

The seventh embodiment can simultaneously form three modifying region groups G2a through G2c along estimated cut lines Ka through Kc, improving the processing efficiency. The embodiment uses three laser heads HLa through HLc to form three modifying region groups G2a through G2c. It may be preferable to use two or four or more laser heads to form two or four or more modifying region groups.

According to the seventh embodiment, similarly to the fifth embodiment, laser beams L1a through L1c are vertically incident on the surface 10b of the wafer 10. It is possible to narrow estimated cut line K where laser beams L1a through L1c are radiated. More chips can be cut out from one wafer 10 than can be yielded by widening estimated cut line K. Chip manufacturing costs can be reduced.

Further, similarly to the fifth embodiment, the seventh embodiment configures movement directions and depth positions for focusing points P1a through P1c with reference to the wafer 10. The purpose is to successively form modifying regions R constituting modifying region groups G2a through G2c starting from the farthest from the surface 10b (incidence plane for laser beam L) of the wafer 10. Modifying region R formed at a shallow portion from the surface 10b of the wafer 10 does not hinder incidence of a laser beam for forming modifying region R at a deep portion. Normal modifying region R can be reliably formed at the deep portion.

8. Eighth Embodiment

Figure 19A:
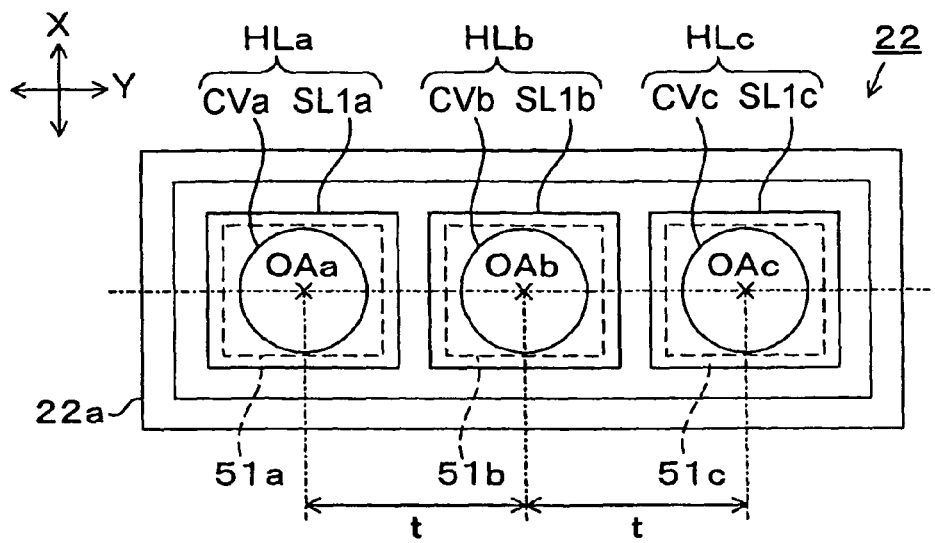
FIG. 19A is a bottom view of a laser radiation apparatus according to an eighth embodiment and FIG. 19B is a fragmentary perspective view of a wafer.
Figure 19B:
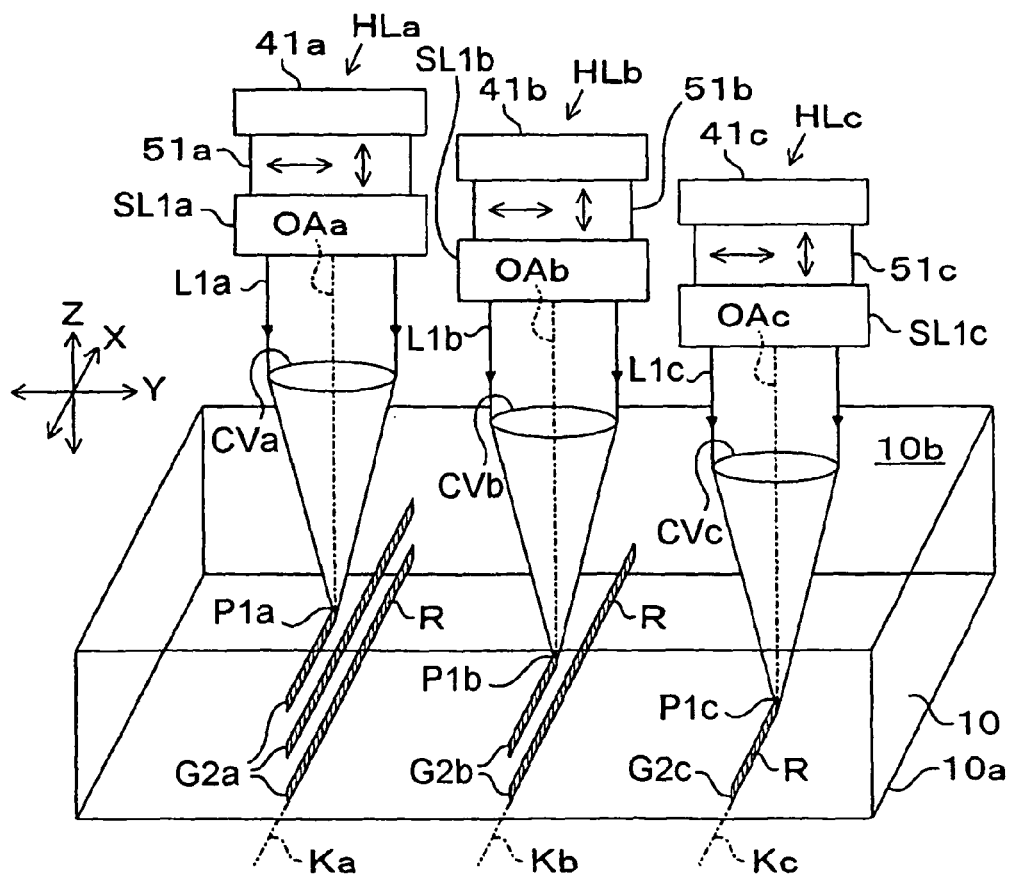

FIG. 19A is a bottom view of the laser radiation apparatus 22 according to an eighth embodiment. FIG. 19B is a fragmentary perspective view of the wafer 10 and illustrates a process to radiate laser beams L1a through L1c to the wafer 10 and form modifying region R according to the eighth embodiment.

The eighth embodiment differs from the seventh embodiment as follows. The eighth embodiment is provided with the same construction as described in <6-1> through <6-4> for the sixth embodiment. The eighth embodiment uses the drive apparatuses 41a through 41c to adjust Z-direction positions of laser heads HLa through HLc. In this manner, the eighth embodiment sets depth positions in the wafer 10 for focusing points P1a through P1c of laser beams L1a through L1c. The eighth embodiment can provide the same operations and working effects as the seventh embodiment.

9. Ninth Embodiment

Figure 20:
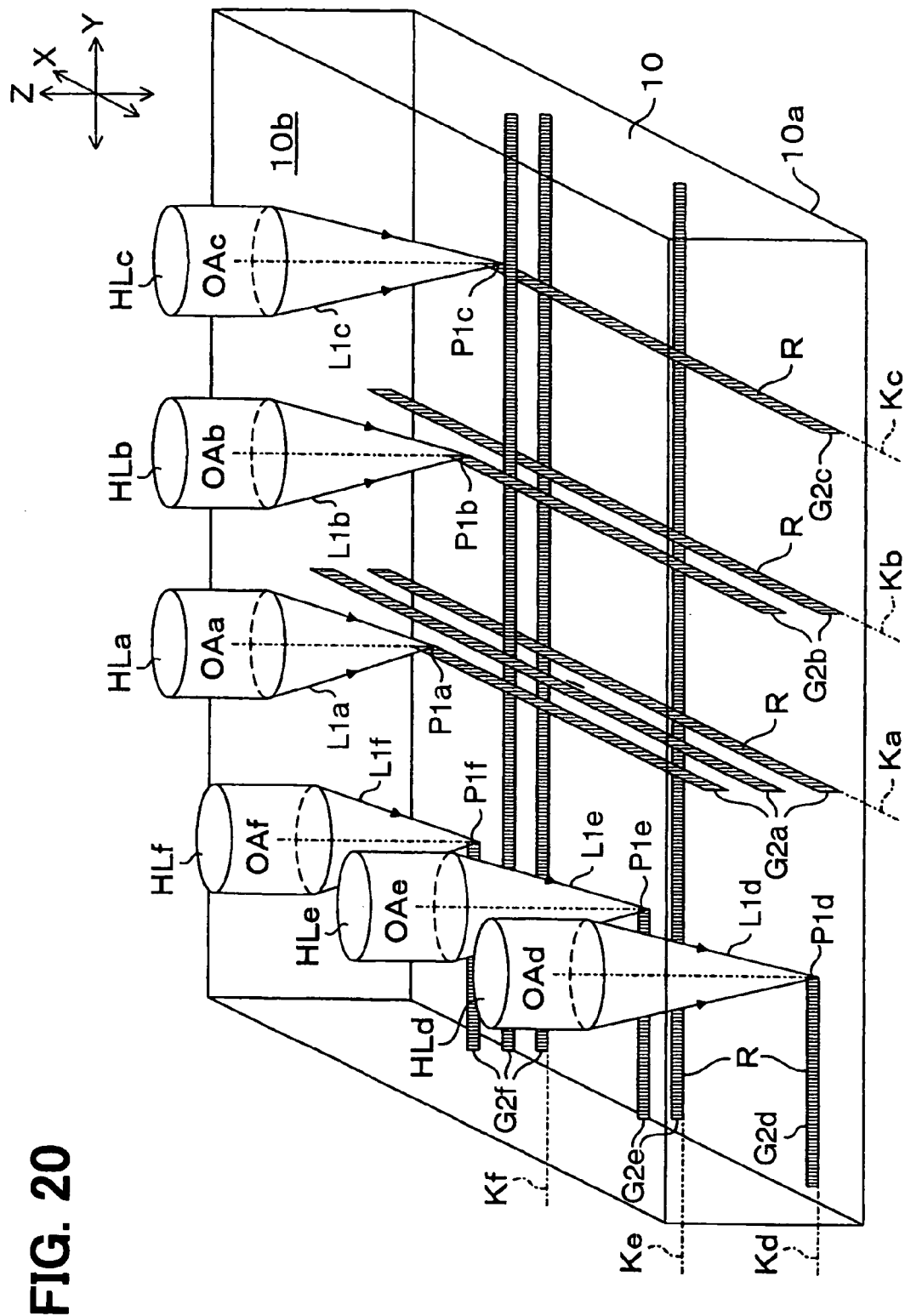
FIG. 20 is a fragmentary perspective view of a wafer according to a ninth embodiment.

FIG. 20 is a fragmentary perspective view of the wafer 10 and illustrates a process to radiate laser beams L1d through L1g to the wafer 10 and form modifying region R according to a ninth embodiment.

The ninth embodiment differs from the seventh or eighth embodiment as follows.
<9-1> The ninth embodiment is provided with a set of three laser heads HLd through HLf constructed similarly to a set of three laser heads HLa through HLc.

Similarly to the seventh or eighth embodiment, the ninth embodiment allows laser heads HLa through HLc to radiate laser beams L1a through L1c and orients optical axes OAa through OAc of the laser beams toward the Z direction. The embodiment moves focusing points P1a through P1c in the X direction relatively to the wafer 10. The embodiment forms modifying regions R constituting three modifying region groups G2a through G2c along parallel estimated cut lines Ka through Kc provided on the wafer 10. The embodiment allows laser heads HLd through HLf to radiate laser beams L1d through L1f and orients optical axes OAd through OAf of the laser beams toward the Z direction. The embodiment moves focusing points P1d through P1f in the X direction relatively to the wafer 10. The embodiment forms modifying regions R constituting three modifying region groups G2d through G2f along parallel estimated cut lines Kd through Kf provided on the wafer 10. Estimated cut lines Ka through Kc are provided along the X direction. Estimated cut lines Kd through Kf are provided along the Y direction. Estimated cut lines Ka through Kf are provided in a grid pattern.

The ninth embodiment provides two sets of three laser heads HLa through HLc and HLd through HLf. The two sets of laser heads simultaneously radiate six pulsed laser beams L1a through L1f. The embodiment moves focusing points P1a through P1f of laser beams L1a through L1f in two directions (X and Y directions) horizontally orthogonal the surface 10b and the reverse side 10a of the wafer 10. The embodiment simultaneously forms six modifying region groups G2a through G2f composed of multiple modifying regions R along six estimated cut lines Ka through Kf provided in a grid pattern on the wafer 10.

The ninth embodiment can simultaneously form modifying regions R constituting three modifying region groups each in both X and Y directions. The ninth embodiment can more improve the processing efficiency than the seventh or eighth embodiment. The embodiment uses two sets of three laser heads HLa through HLc and HLd through HLf to form six modifying region groups G2a through G2f. It may be preferable to form multiple modifying region groups using three or more sets of two or four or more laser heads.

10. Tenth Embodiment

Figure 21A:
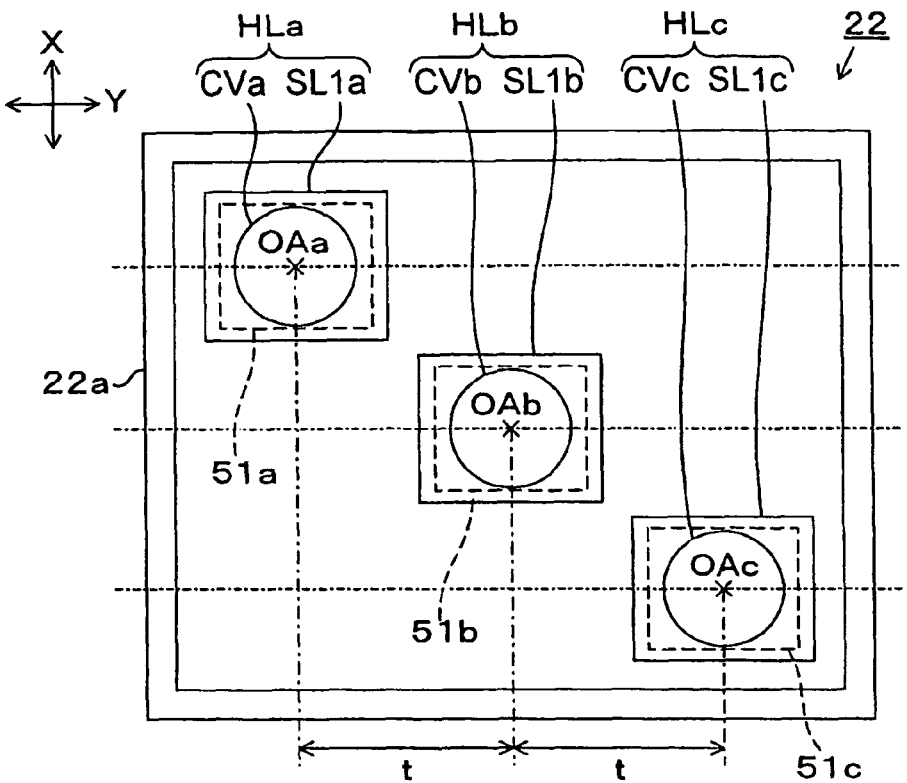
FIGS. 21A and 21B are bottom views of a laser radiation apparatus according to a tenth embodiment.
Figure 21B:
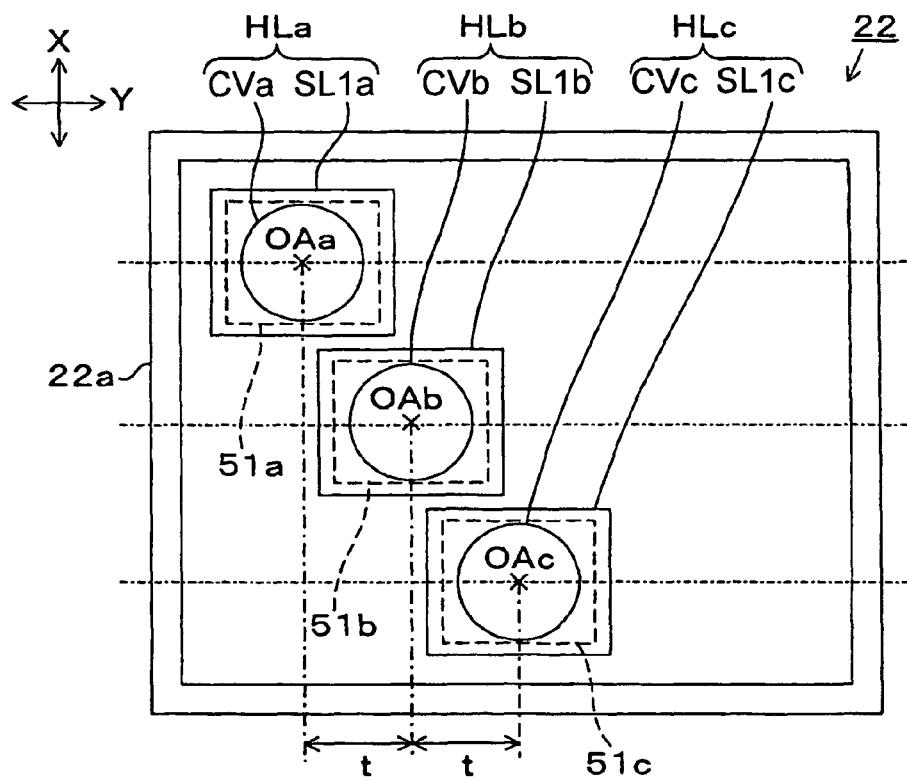

FIGS. 21A and 21B are bottom views of the laser radiation apparatus 22 according to a tenth embodiment. The tenth embodiment differs from the seventh or eighth embodiment as follows. Laser heads HLa through HLc are provided in the laser radiation apparatus 22. Each laser head is shifted in the X direction at least by its width.

The tenth embodiment can minimize interval t between optical axes OAa through OAc down to zero using drive apparatuses 51a through 51c to adjust Y-direction positions of laser heads HLa through HLc. The embodiment can provide smaller interval t than the seventh or eighth embodiment. It is possible to easily cut and separate a small chip from the wafer 10.

11. Other Embodiments

The invention is not limited to the above-mentioned embodiments and may be embodied as follows. In such case, the invention can provide operations and working effects equivalent or superior to the above-mentioned embodiments.

(1) While the third and fourth embodiments are applied to the two-layer wafer with the wafers 12 and 13 layered, the invention is not limited thereto. The invention may be applied to wafers made of semiconductor materials for fabricating any multi-layer semiconductor substrate.

For example, the multi-layer wafers include the following. One is a bonded SOI (Silicon On Insulator) wafer. Another is a SIMOX (Separation by IMplanted OXygen) wafer. Still another is an SOI wafer formed of polycrystal silicon or amorphous silicon on an insulated substrate such as glass by means of the solid-phase growth method or the melt recrystallization method. Yet another is a wafer used for a semiconductor light emitting device resulting from crystal growth of a III-V compound semiconductor layer on a substrate such as sapphire. Still yet another is a wafer formed by bonding a silicon substrate and a glass substrate by means of anodic bonding.

(2) While the above-mentioned embodiments are applied to the bulk silicon wafers 10, 12, and 13, the present invention is not limited thereto. The invention may be applied to any wafer that is made of a semiconductor material (e.g., Gallium Arsenide) for fabricating semiconductor substrate (e.g., Gallium Arsenide substrate). The invention may be applied to wafers made of a semiconductor material for fabricating semiconductor substrates, but also wafers made of various materials including glass. In the third and fourth embodiments, the wafers 12 and 13 may be made of different materials such as glass and silicon, for example.

In such case, the modifying region R formed by multiphoton absorption is not limited to those including the melt treatment region as described in the above-mentioned embodiment, but may appropriately conform to wafer formation materials. When the wafer formation material contains glass, for example, the modifying region R formed by multiphoton absorption may contain a crack region or a region with a modified refractive index. Patent document 1 discloses the modifying region containing the crack region or a region with a modified refractive index and a detailed description is omitted for simplicity.

(3) While the fifth through tenth embodiments are applied to the bulk silicon wafer, the invention is not limited thereto. The invention may be applied to wafers made of a semiconductor material for fabricating multi-layer semiconductor substrates. In such case, for example, the following wafers are available. One is a bonded SOI wafer. Another is a SIMOX wafer. Still another is an SOI wafer formed of polycrystal silicon or amorphous silicon on an insulated substrate such as glass by means of the solid-phase growth method or the melt recrystallization method. Yet another is a wafer used for a semiconductor light emitting device resulting from crystal growth of a III-V compound semiconductor layer on a substrate such as sapphire. Still yet another is a wafer formed by bonding a silicon substrate and a glass substrate by means of anodic bonding.

One laser processing apparatus 20 is provided with multiple laser heads HLa through HLf. When a multi-layer wafer is made of multiple layered wafers with different materials, the material for each layer of the multi-layer wafer can be provided with an optimal wavelength and numeric aperture for laser beams L1a through L1f radiated from laser heads HLa through HLf. An optimal laser beam can be radiated to each layer. It is possible to reliably form normal modifying region R for each layer.

The following shows a conventional technique of forming modifying region R in each layer of a multi-layer wafer including multiple layered wafers made of different materials. There is provided a laser processing apparatus having a laser head for radiating a laser beam corresponding to the material of each layer of the multi-layer wafer. The wafer needs to be transferred to another laser processing apparatus each time modifying region R is formed in one layer. When the above-mentioned embodiments are applied to laser processing of multi-layer wafers, only one laser processing apparatus 20 can be used to radiate an optimal laser beam corresponding to the material of each layer of the multi-layer wafer. The wafer need not be transferred to another laser processing apparatus. Modifying region R can be simultaneously or successively formed for each layer. Accordingly, the processing efficiency improves. It is possible to reduce an apparatus installation space compared to installation of multiple laser processing apparatuses.

(4) The above-mentioned embodiments expand the dicing film 11 to cut and separate the wafers 10, 12, and 13. Further, a pressure can be applied by pressing a curved surface (bulging surface) of an object (e.g., hemispheroid) having a curvature against estimated cut line K of the wafers 10, 12, and 13. This may cause a shear stress in modifying region R constituting multiple layers of modifying region groups to cut and separate the wafers 10, 12, and 13.

It will be obvious to those skilled in the art that various changes may be made in the above-described embodiments of the present invention. However, the scope of the present invention should be determined by the following claims.

What is claimed is:

1. A laser processing apparatus that radiates a laser beam to a focusing point in a wafer to form a modifying region due to multiphoton absorption in the wafer, the apparatus comprising:
 a single laser light source with only one laser light generator present in the internal of the single laser light source for simultaneously generating and radiating laser beams having a plurality of different wavelengths; and
 one condenser lens for converging the laser beams simultaneously radiated from the single laser light source on a plurality of different focusing points, respectively,
 wherein the laser beams having the plurality of wavelengths are simultaneously radiated to the plurality of focusing points respectively inside from a surface of the wafer to simultaneously form a plurality of modifying regions, which are disposed with an interval in a depth direction from the surface of the wafer, along an estimated cut line of the wafer.

2. The laser processing apparatus of claim 1,
 wherein a one-layer modifying region group, which includes a plurality of modifying regions formed at an interval horizontally with reference to a surface and a reverse side of the wafer, is formed by moving at least one of the focusing points relatively to the wafer while radiating the laser beam in a pulsed manner to form a modifying region due to multiphoton absorption in the wafer along an estimated cut line for the wafer, and
 wherein a depth position is stepwise changed for the at least one of the focusing points in the wafer to successively form the modifying region groups of a plurality of layers at an interval in a depth direction from the surface of the wafer.

3. The laser processing apparatus according to claim 1, wherein
the plurality of different wavelengths of the laser beams radiated from the single laser light source are 1064 nm and 1319 nm.

4. The laser processing apparatus according to claim 1, wherein
the laser beams radiated from the single laser light source use a YAG (Yttrium Aluminum Garnet) laser.

5. The laser processing apparatus according to claim 1, wherein
the laser beam is moved while being radiated in a pulsed manner to form a modifying region due to multiphoton absorption in the wafer along the estimated cut line of the wafer to thereby form a multi-layer modifying region group, which includes the plurality of modifying regions;
a plurality of the multi-layer modifying region groups are formed at intervals horizontally with reference to the surface and the reverse side of the wafer by moving the focusing point (Pa to Pb) relatively to the wafer such that a depth position for a focusing point is stepwise changed, from a farther position to a nearer position with respect to the laser light source; and
forming of a newer multi-layer modifying region group is started at a depth position nearer to the laser light source than a previously formed multi-layer modifying region group, if present.

6. A laser processing method for radiating a laser beam to a focusing point in a wafer to form a modifying region due to multiphoton absorption in the wafer by using (i) one laser light source with only one laser light generator present in the internal of the single laser light source for simultaneously generating and radiating a laser beam having a plurality of wavelengths and (ii) one condenser lens for converging a laser beam radiated from the laser light source on the focusing point,
the method comprising:
selecting a plurality of wavelengths of a laser beam appropriate to a plurality of focusing points inside the wafer; and
radiating, from a surface of the wafer, the laser beam having the plurality of wavelengths to the plurality of focusing points simultaneously to form a plurality of modifying regions simultaneously along an estimated cut line of the wafer, the modifying regions disposed with an interval in a depth direction from the surface of the wafer.

7. The laser processing method of claim 6, further comprising:
forming a one-layer modifying region group, which includes a plurality of modifying regions formed at an interval horizontally with reference to a surface and a reverse side of the wafer, by moving the focusing point relatively to the wafer while radiating the laser beam in a pulsed manner to form a modifying region due to multiphoton absorption in the wafer along the estimated cut line for the wafer; and
changing stepwise a depth position for a focusing point in the wafer to successively form the modifying region groups of a plurality of layers at an interval in a depth direction from the surface of the wafer.

8. The laser processing method according to claim 6, wherein
the plurality of different wavelengths of the laser beams radiated from the single laser light source are 1064 nm and 1319 nm.

9. The laser processing method according to claim 6, wherein
the laser beams radiated from the single laser light source use a YAG (Yttrium Aluminum Garnet) laser.

10. The laser processing method according to claim 6, further comprising:
moving the laser beam being radiated in a pulsed manner along the estimated cut line of the wafer to thereby form a multi-layer modifying region group, which includes the plurality of modifying regions,
wherein:
a plurality of the multi-layer modifying region groups are formed at intervals horizontally with reference to the surface and the reverse side of the wafer by moving the focusing point relatively to the wafer such that a depth position for a focusing point is stepwise changed, from a farther position to a nearer position with respect to the laser light source; and
forming of a newer multi-layer modifying region group is started at a depth position nearer to the laser light source than a previously formed multi-layer modifying region group, if present.

\* \* \* \* \*